(12) United States Patent
Lee et al.

(10) Patent No.: US 12,739,004 B2
(45) Date of Patent: Sep. 15, 2026

(54) METHOD AND APPARATUS FOR FEEDBACK CHANNEL STATUS INFORMATION BASED ON MACHINE LEARNING IN WIRELESS COMMUNICATION SYSTEM

(71) Applicant: ELECTRONICS AND TELECOMMUNICATIONS RESEARCH INSTITUTE, Daejeon (KR)

(72) Inventors: An Seok Lee, Daejeon (KR); Han Jun Park, Daejeon (KR); Yong Jin Kwon, Daejeon (KR); Heesoo Lee, Daejeon (KR); Yun Joo Kim, Daejeon (KR); Hyun Seo Park, Daejeon (KR); Jung Bo Son, Daejeon (KR); Yu Ro Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 356 days.

(21) Appl. No.: 18/503,993

(22) Filed: Nov. 7, 2023

(65) Prior Publication Data

US 2024/0154670 A1 May 9, 2024

(30) Foreign Application Priority Data

Nov. 7, 2022 (KR) ........................ 10-2022-0147236
Feb. 17, 2023 (KR) ........................ 10-2023-0021289

(51) Int. Cl.
*H04B 7/06* (2006.01)
*H04B 17/391* (2015.01)

(52) U.S. Cl.
CPC ......... *H04B 7/0626* (2013.01); *H04B 7/0658* (2013.01); *H04B 17/3913* (2015.01)

(58) Field of Classification Search
CPC . H04B 7/0626; H04B 17/3913; H04B 7/0658
See application file for complete search history.

(56) References Cited

U.S. PATENT DOCUMENTS 11,522,639 B2 12/2022 Kim et al.
2022/0006543 A1 1/2022 Jeon et al.
2022/0123808 A1 4/2022 Shen
2022/0271851 A1 8/2022 Prasad et al.
2022/0352955 A1 11/2022 Zeng et al.
2022/0376957 A1 11/2022 Song
2022/0383118 A1 12/2022 Nair et al.
2022/0394653 A1 12/2022 Chang et al.
2022/0400373 A1 12/2022 Zhu et al.
2023/0370885 A1* 11/2023 Lee ...................... H04B 7/0626
2023/0412227 A1* 12/2023 Abebe ................... H04L 1/0026

(Continued)

*Primary Examiner* — Duc C Ho

(57) ABSTRACT

A method of a terminal may comprise: receiving a channel state information (CSI) request message from a base station, the CSI request message including first indication information indicating one of quantization configuration information of a first artificial intelligence (AI) model configured in the terminal to encode and transmit CSI; quantizing generated CSI feedback information based on the first indication information; and transmitting a CSI report message including the quantized CSI feedback information to the base station.

20 Claims, 16 Drawing Sheets

(56) References Cited

U.S. PATENT DOCUMENTS

| | | | | |
|---|---|---|---|---|
| 2024/0097764 | A1* | 3/2024 | Jeon | H04W 24/10 |
| 2024/0283611 | A1* | 8/2024 | Niu | H04L 25/0254 |
| 2025/0220480 | A1* | 7/2025 | Zhang | H04W 24/10 |

* cited by examiner

110-1
110-2
110-3
120-1
120-2
130-1
130-2
130-3
130-4
130-5
130-6 training
1430
1421
encoder
1420
1411
decoder
1410

FIG. 17
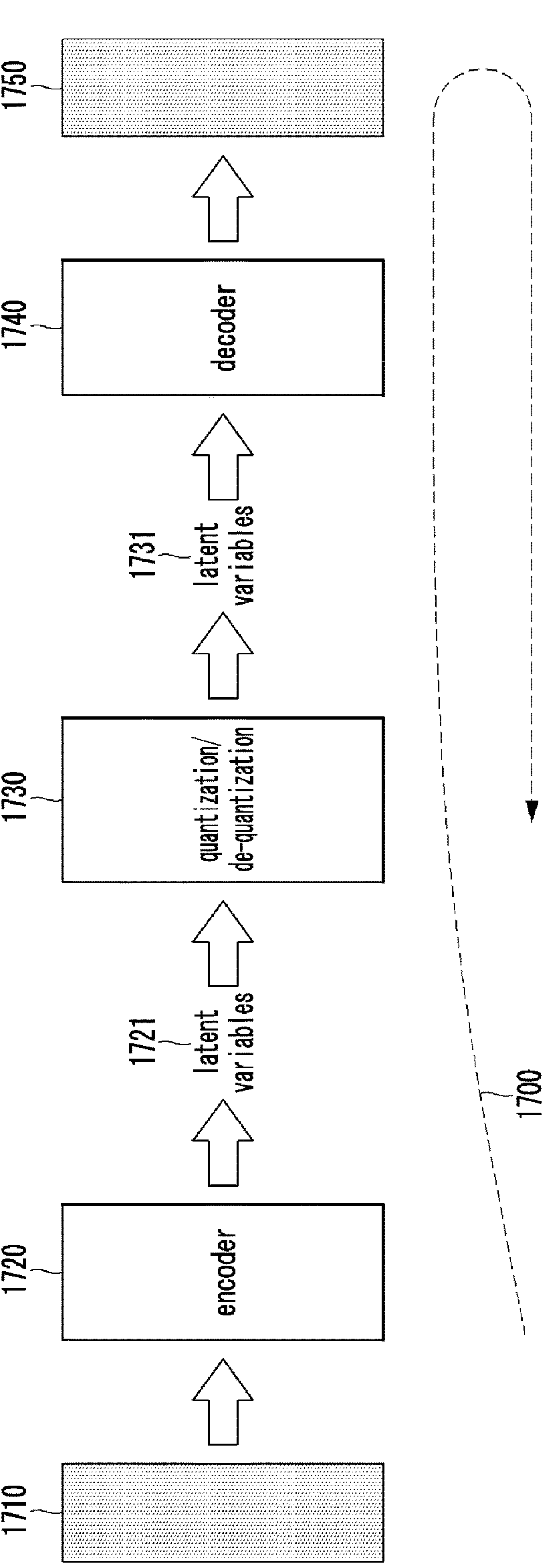

METHOD AND APPARATUS FOR FEEDBACK CHANNEL STATUS INFORMATION BASED ON MACHINE LEARNING IN WIRELESS COMMUNICATION SYSTEM

CROSS-REFERENCE TO RELATED APPLICATIONS

This application claims priority to Korean Patent Applications No. 10-2022-0147236, filed on Nov. 7, 2022, and No. 10-2023-0021289, filed on Feb. 17, 2023, with the Korean Intellectual Property Office (KIPO), the entire contents of which are hereby incorporated by reference.

BACKGROUND

1. Technical Field

Exemplary embodiments of the present disclosure relate to a channel state information feedback technique, and more specifically, to a channel state information feedback technique based on machine learning.

2. Related Art

The International Telecommunication Union (ITU) is developing the International Mobile Telecommunication (IMT) framework and standards. Recently, it has been discussing 6th generation (6G) communications through a program called 'IMT for 2030 and beyond.'

Among the technologies for implementing 6G, the fields that are receiving a lot of attention are artificial intelligence (AI) and machine learning (ML). The 3rd Generation Partnership Project (3GPP) started conducting researches on AI/ML technologies for air interfaces from Release-18 (Rel-18). The main use cases of the researches conducted in the 3GPP are as follows.

AI/ML for channel state information (CSI) feedback enhancement

AI/ML for beam management

AI/ML for positioning performance enhancement

In a wireless communication system, a CSI reporting procedure is performed in which a receiver generates CSI after receiving a CSI-reference signal (RS) and transmits the CSI to a transmitter. In this case, in order to precisely represent channel information, the amount of information should be very large, which increases the occupancy and overhead of radio transmission resources and reduces system performance. In particular, precisely representing channel information for expressing channel variation to determine precoding at the transmitter or precoding information for recommending an appropriate precoding vector at the receiver may cause a large overhead.

To resolve the above-described problem in a mobile communication network, researches have begun on technologies for the transmitter to obtain channel state information with high accuracy while minimizing the amount of transmitted information using machine learning (ML) technologies. Discussions have begun to apply these technologies to 5G and later mobile communication systems. An autoencoder-based neural network has been proposed as a machine learning structure to deliver channel information. The autoencoder-based neural network has been proposed as a convolutional neural network (CNN)-based artificial neural network in which radio channel information is input in form of an image and compressed into a form of a code vector in a low-dimensional latent space through an encoder network, and it is decompressed to the original radio channel information through a decoder network. The CNN can perform efficient compression and decompression. However, when using machine learning, the amount of information to be transmitted is large because the entire channel information is transmitted, and since the compressed low-dimensional code vector has real values, a quantization process may need to be additionally considered to transmit the information from the receiver to the transmitter in actual systems. To resolve the above-described problem, a compressed transmission and restoration process considering quantization has been proposed. However, in the compressed transmission and recovery process considering quantization, when training is performed according to each quantization scheme, the corresponding trained model supports only the quantization scheme considered during training. Therefore, when various schemes of quantization or CSI reporting payload sizes are considered in an actual network, there is a disadvantage that a separate trained model is required for each quantization scheme or CSI reporting payload size.

SUMMARY

Exemplary embodiments of the present disclosure are directed to providing a method and an apparatus for machine learning-based channel state information feedback, which support scalability of a mobile communication system.

According to a first exemplary embodiment of the present disclosure, a method of a terminal may comprise: receiving a channel state information (CSI) request message from a base station, the CSI request message including first indication information indicating one of quantization configuration information of a first artificial intelligence (AI) model configured in the terminal to encode and transmit CSI; quantizing generated CSI feedback information based on the first indication information; and transmitting a CSI report message including the quantized CSI feedback information to the base station.

The CSI feedback information request message may further include second indication information for subband(s) and layer(s), and the second indication information may indicate one of: (1) individual subband and individual layer; (2) all subbands and individual layer; (3) individual subband and all layers; and (4) all subbands and all layers.

When the CSI feedback information request message includes third indication information requesting at least one of common information of all subbands or common information of all layers, the CSI feedback information may further include common information of all subbands and common information of all layers, and the CSI feedback information report message may include at least one of the common information of all subbands or the common information of all layers.

The method may further comprise: performing training of the first AI model and a second AI model configured in a base station to decode the CSI feedback information; transmitting the second AI model to the base station; and transmitting quantization configuration information of the first AI model to the base station, wherein the quantization configuration information of the first AI model is generated based on a distribution of latent variables for input datasets of the first AI model and the second AI model.

The quantization configuration information of the first AI model may include reference numbers respectively mapped to quantization schemes, wherein the quantization schemes of the first AI model may include a vector quantization scheme, a uniform scalar quantization scheme, and a non-uniform scalar quantization scheme.

The quantization configuration information of the first AI model may further include information on a codebook consisting of latent variables when performing vector quantization, a number of quantized bits and quantization configuration information for each dimension of the latent variable when performing uniform scalar quantization, and a number of quantized bits and quantization configuration information for each dimension of the latent variable when performing non-uniform scalar quantization.

The quantization configuration information of the first AI model may further include information on a minimum value and a maximum value required when using uniform scalar quantization, and may further include information on a decision boundary and representation value(s) required when using non-uniform scalar quantization.

The method may further comprise: transmitting a training request message to the base station, the training request message including training type-related information for the first AI model and a second AI model configured in the terminal for decoding CSI feedback information to derive CSI; performing training of the first AI model when receiving a first training response message indicating that training is possible from the base station; generating a dataset for training the second AI model; transmitting the dataset to the base station; and receiving a second training response message from the baser station, the second training response message including information on a training result of the second AI model.

The training type-related information may include an input type, input dimension, input representation scheme, latent dimension, and latent representation scheme of the first AI model and the second AI model.

According to a second exemplary embodiment of the present disclosure, a method of a base station may comprise: transmitting a channel state information (CSI) request message to a terminal, the CSI request message including first indication information indicating one of quantization configuration information of a first artificial intelligence (AI) model configured in the terminal to encode and transmit CSI; and receiving, from the terminal, a CSI report message including CSI feedback information quantized based on the first indication information of the CSI request message.

The CSI feedback information request message may further include second indication information for subband(s) and layer(s), and the second indication information may indicate one of: (1) individual subband and individual layer; (2) all subbands and individual layer; (3) individual subband and all layers; and (4) all subbands and all layers.

The CSI feedback information request message may further include third indication information requesting at least one of common information of all subbands or common information of all layers, and the CSI feedback information report message may include at least one of the common information of all subbands or the common information of all layers.

The method may further comprise: receiving a second AI model from the terminal; and receiving quantization configuration information of the first AI model from the terminal.

The quantization configuration information of the first AI model may include reference numbers respectively mapped to quantization schemes, wherein the quantization schemes of the first AI model may include a vector quantization scheme, a uniform scalar quantization scheme, and a non-uniform scalar quantization scheme.

The quantization configuration information of the first AI model may further include information on a codebook consisting of latent variables when performing vector quantization, a number of quantized bits and quantization configuration information for each dimension of the latent variable when performing uniform scalar quantization, and a number of quantized bits and quantization configuration information for each dimension of the latent variable when performing non-uniform scalar quantization; and the quantization configuration information of the first AI model may further include information on a minimum value and a maximum value required when using uniform scalar quantization, and further includes information on a decision boundary and representation value(s) required when using non-uniform scalar quantization.

The method may further comprise: receiving a training request message from the terminal, the training request message including training type-related information of the first AI model and the second AI model; identifying whether training of the second AI model is possible; in response to identifying that the training of the second AI model is possible, transmitting a first training response message indicating that the training is possible to the terminal; receiving a dataset for training the second AI model from the terminal; training the second AI model using the dataset; and transmitting a second training response message including information on a training result of the second AI model to the terminal.

The training type-related information may include an input type, input dimension, input representation scheme, latent dimension, and latent representation scheme of the first AI model and the second AI model.

According to a third exemplary embodiment of the present disclosure, a terminal may comprise at least one processor, and the at least one processor may cause the terminal to perform: receiving a channel state information (CSI) request message from a base station, the CSI request message including first indication information indicating one of quantization configuration information of a first artificial intelligence (AI) model configured in the terminal to encode and transmit CSI; quantizing generated CSI feedback information based on the first indication information; and transmitting a CSI report message including the quantized CSI feedback information to the base station.

The at least one processor may further cause the terminal to perform: performing training of the first AI model and a second AI model configured in a base station to decode the CSI feedback information; transmitting the second AI model to the base station; and transmitting quantization configuration information of the first AI model to the base station, wherein the quantization configuration information of the first AI model is generated based on a distribution of latent variables for input datasets of the first AI model and the second AI model.

The at least one processor may further cause the terminal to perform: transmitting a training request message to the base station, the training request message including training type-related information for the first AI model and a second AI model configured in the terminal for decoding CSI feedback information to derive CSI; performing training of the first AI model when receiving a first training response message indicating that training is possible from the base station; generating a dataset for training the second AI model; transmitting the dataset to the base station; and receiving a second training response message from the baser station, the second training response message including information on a training result of the second AI model.

According to an exemplary embodiment of the present disclosure, CSI can be reported through trained AI models and/or ML models in a mobile communication network, and in this case, a two-sided learning model can be used. The methods of applying an AI model and/or ML model using non-quantized latent variables, which have the advantage of supporting various quantization schemes and CSI reporting payload sizes by using a single ML model. For this purpose, the present disclosure proposes the procedure of training two-sided AI models and/or ML models and the procedure of reporting CSI using the trained AI models and/or ML models.

In addition, individual frequency units such as subbands and individual layer units can be used as unit inputs for the AI models and/or ML models according to exemplary embodiments of the present disclosure, and can be repeatedly used to support various numbers of subbands and layers. This has the advantage of compressing and delivering CSI of various numbers of subbands and layers using a single AI model and/or ML model.

BRIEF DESCRIPTION OF DRAWINGS

FIG. 1 is a conceptual diagram illustrating an exemplary embodiment of a communication system.

FIG. 17 is a conceptual diagram illustrating a quantization aware training method for AI model for transmitting and receiving CSI feedback information.

DETAILED DESCRIPTION

Figure 2:
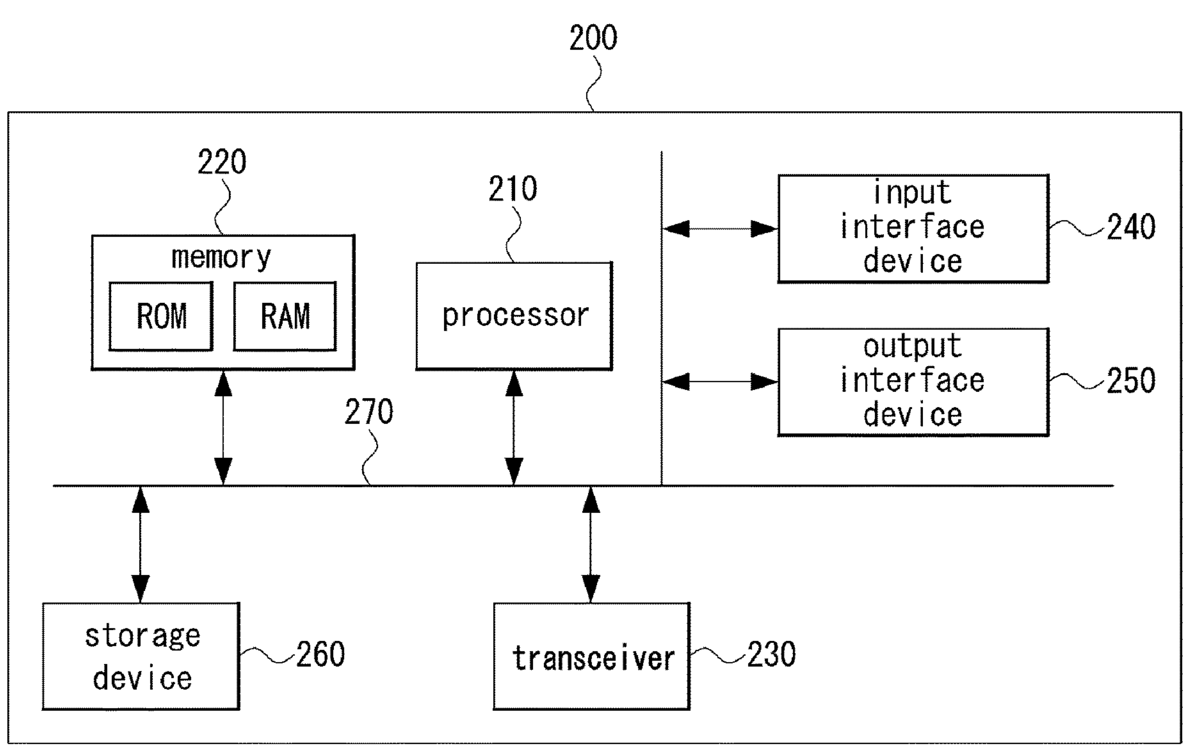
FIG. 2 is a block diagram illustrating an exemplary embodiment of a communication node constituting a communication system.

While the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSUPA), 4G mobile communication network such as a long term evolution (LTE) network or an LTE-Advanced network, 5G mobile communication network, or the like.

Throughout the present disclosure, a terminal may refer to a mobile station, mobile terminal, subscriber station, portable subscriber station, user equipment, access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present specification, the base station may refer to an access point, radio access station, node B (NB), evolved node B (eNB), base transceiver station, mobile multihop relay (MMR)-BS, or the like, and may include all or part of functions of the base station, access point, radio access station, NB, eNB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and redundant descriptions for the same elements are omitted.

Figure 1:
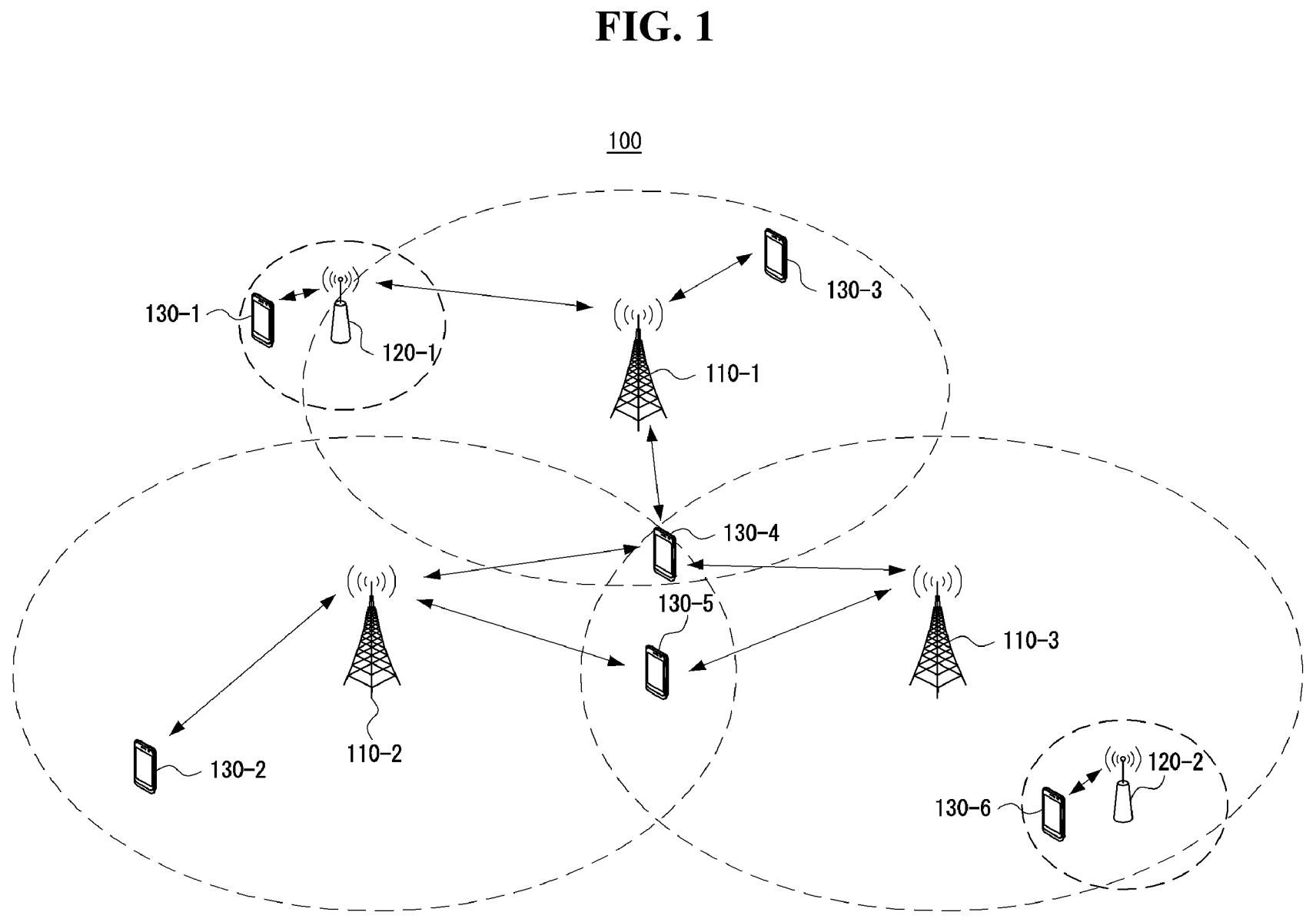

FIG. 1 is a conceptual diagram illustrating an exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4th generation (4G) communication (e.g., long term evolution (LTE), LTE-advanced (LTE-A)), 5th generation (5G) communication (e.g., new radio (NR)), or the like. The 4G communication may be performed in a frequency band of 6 gigahertz (GHz) or below, and the 5G communication may be performed in a frequency band of 6 GHz or above as well as the frequency band of 6 GHz or below.

For example, for the 4G and 5G communications, the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like.

In addition, the communication system 100 may further include a core network. When the communication system 100 supports the 4G communication, the core network may comprise a serving gateway (S-GW), a packet data network (PDN) gateway (P-GW), a mobility management entity (MME), and the like. When the communication system 100 supports the 5G communication, the core network may comprise a user plane function (UPF), a session management function (SMF), an access and mobility management function (AMF), and the like.

Meanwhile, each of the plurality of communication nodes 110-1, 110-2, 110-3, 120-1, 120-2, 130-1, 130-2, 130-3, 130-4, 130-5, and 130-6 constituting the communication system 100 may have the following structure.

FIG. 2 is a block diagram illustrating an exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, a road side unit (RSU), a radio remote head (RRH), a transmission point (TP), a transmission and reception point (TRP), an eNB, a gNB, or the like.

Here, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, an Internet of things (IoT) device, a mounted apparatus (e.g., a mounted module/device/terminal or an on-board device/terminal, etc.), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support multi-input multi-output (MIMO) transmission (e.g., a single-user MIMO (SU-MIMO), multi-user MIMO (MU-MIMO), massive MIMO, or the like), coordinated multipoint (CoMP) transmission, carrier aggregation (CA) transmission, transmission in an unlicensed band, device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and operations supported by the plurality of base stations 110-1, 110-2, 110-3, 120-1, and 120-2. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, methods for configuring and managing radio interfaces in a communication system will be described. Even when a method (e.g., transmission or reception of a signal) performed at a first communication node among communication nodes is described, the corresponding second communication node may perform a method (e.g., reception or transmission of the signal) corresponding to the method performed at the first communication node. That is, when an operation of a terminal is described, a corresponding base station may perform an operation corresponding to the operation of the terminal. Conversely, when an operation of a base station is described, a corresponding terminal may perform an operation corresponding to the operation of the base station.

Meanwhile, in a communication system, a base station may perform all functions (e.g., remote radio transmission/reception function, baseband processing function, and the like) of a communication protocol. Alternatively, the remote radio transmission/reception function among all the functions of the communication protocol may be performed by a transmission reception point (TRP) (e.g., flexible (f)-TRP), and the baseband processing function among all the functions of the communication protocol may be performed by a baseband unit (BBU) block. The TRP may be a remote radio head (RRH), radio unit (RU), transmission point (TP), or the like. The BBU block may include at least one BBU or at least one digital unit (DU). The BBU block may be referred to as a 'BBU pool', 'centralized BBU', or the like. The TRP may be connected to the BBU block through a wired fronthaul link or a wireless fronthaul link. The communication system composed of backhaul links and fronthaul links may be as follows. When a functional split scheme of the communication protocol is applied, the TRP may selectively perform some functions of the BBU or some functions of medium access control (MAC)/radio link control (RLC) layers.

The fields that are receiving a lot of attention are artificial intelligence (AI) and machine learning (ML). The 3rd Generation Partnership Project (3GPP) started conducting researches on AI/ML technologies for air interfaces from Release-18 (Rel-18). The main use cases of the research conducted in the 3GPP are as follows.

AI/ML for channel state information (CSI) feedback enhancement

AI/ML for beam management

AI/ML for positioning performance enhancement

The present disclosure is highly relevant to the first use case for improving performance for CSI feedback. More specifically, in a mobile communication network, a transmitter may perform adjustments of the coding level of a data signal, power allocation, and beamforming using multiple transmission antennas to transmit data to a receiver. For this purpose, the transmitter may need to obtain information on a radio channel between antennas of the transmitter and receiver. However, since the channel from the transmitter to the receiver cannot be directly observed at the transmitter, a channel state information (CSI) reporting procedure, which is a procedure for reporting channel information measured at the receiver to the transmitter, is necessary. The CSI may be used as information for scheduling data transmission from the transmitter to the receiver. Examples of the CSI may include rank, channel quality index, and precoding information.

A reference signal such as CSI-reference signal (CSI-RS) has been designed to measure a channel state in the receiver. The transmitter may transmit the CSI-RS periodically or aperiodically. Therefore, the transmitter may configure transmission-related information in advance so that the receiver can receive the CSI-RS transmitted periodically or aperiodically.

In a wireless communication system, a CSI reporting procedure is performed in which a receiver generates CSI after receiving a CSI-reference signal (RS) and transmits the CSI to a transmitter. In this case, to precisely represent channel information, the amount of information should be very large, which increases the occupancy and overhead of radio transmission resources and reduces system performance. In particular, precisely representing channel information for expressing channel variation to determine precoding at the transmitter or precoding information for recommending an appropriate precoding vector at the receiver may cause a large overhead.

To resolve the above-described problem in a mobile communication network, researches have begun on technologies for the transmitter to obtain channel state information with high accuracy while minimizing the amount of transmitted information using machine learning (ML) technologies. Discussions have begun to apply these technologies to 5G and later mobile communication systems. An autoencoder-based neural network has been proposed as a machine learning structure to deliver channel information. The autoencoder-based neural network has been proposed as a convolutional neural network (CNN)-based artificial neural network in which radio channel information input in a form of an image is compressed into a code vector in a low-dimensional latent space through an encoder network, and the original radio channel information is restored through a decoder network. The CNN can facilitate efficient compression and restoration. However, when using ML, since the amount of information to be transmitted is large because the entire channel information is transmitted, and the compressed low-dimensional code vector has real values, a quantization process should be additionally considered to deliver the information from the receiver to the transmitter in an actual system. To solve the above-described problem, a compressed transmission and restoration process considering quantization has been proposed. However, in the compressed transmission and restoration process considering quantization, when training is performed according to each quantization scheme, a model trained accordingly supports only the quantization scheme considered during the training. For this reason, when various quantization schemes or CSI report payload sizes are considered in an actual network, there is a disadvantage that a separate trained model is required for each quantization scheme or CSI reporting payload size.

To resolve the above-described problem, the present disclosure proposes a method for supporting different quantization schemes and payload sizes using a single model in a CSI reporting technique by applying ML technology in a mobile communication network. Further, the present disclosure proposes a method for training and operating a two-sided ML model to support different quantization schemes and payload sizes using a single model. Additionally, the present disclosure proposes a method for supporting different frequencies and layer sizes using a single model.

The proposed methods will be described in more detail through exemplary embodiment of the present disclosure described below.

In the present disclosure described below, a mobile communication system, which is a specific type of wireless communication system, will be described as an example. It should be noted that this is merely intended to aid understanding of the present disclosure described below, and the present disclosure is not limited thereto. In other words, a wireless communication system may be composed of a first communication node and a second communication node. In this case, when the first communication node operates as a transmitter, the second communication node may operate as a receiver, and when the first communication node operates as a receiver, the second communication node may operate as a transmitter. Therefore, hereinafter, when a base station of the mobile communication system operates as a transmitter, a terminal thereof may operate as a receiver.

[1] Artificial Neural Network Operation Method Considering Quantization

The present disclosure assumes that CSI feedback based on a two-sided machine learning model is performed in a mobile communication system consisting of a base station and a terminal. In this case, the base station may use non-quantized latent variables as inputs to a restoration artificial neural network. In addition, the terminal may transmit a CSI report expressed in binary to the base station. Therefore, the base station may receive the CSI report expressed in binary from the terminal, and the base station may de-quantize the CSI report and input it into the restoration artificial neural network to derive the final CSI.

Figure 3:
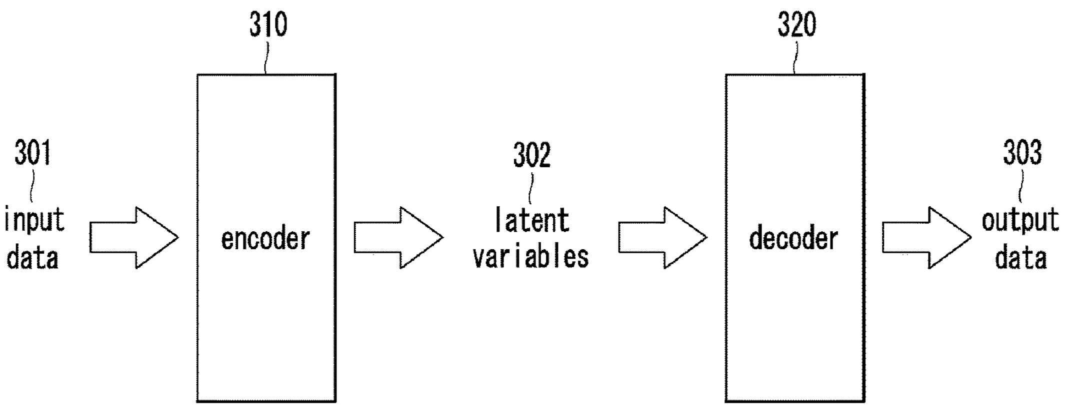
FIG. 3 is a conceptual diagram illustrating a two-sided machine learning model.

FIG. 3 is a conceptual diagram illustrating a two-sided machine learning model.

Referring to FIG. 3, an encoder 310 and a decoder 320 are illustrated. The encoder 310 may encode input data 301 using a predetermined encoding scheme. The encoded information may be output as latent variables 302. The latent variables 302 may be input to the decoder 320. The decoder 320 may decode the latent variables 302 and generate output data 303 as a result.

A wireless communication system, such as the 5G NR system, may apply the two-sided ML model described in FIG. 3. The two-sided ML model in FIG. 3 may be applied to a base station and a terminal of the 5G NR system or a 6G system that will provide services in the future.

Since the present disclosure will describe a method for CSI feedback, hereinafter, a two-sided ML model for CSI feedback in a wireless communication system will be described.

The two-sided ML model illustrated in FIG. 3 may be trained in each of the base station and terminal. Alternatively, only the base station may train the two-sided ML model. Conversely, only the terminal may train the two-sided ML model. As another example, the two-sided ML model may be trained in a specific server on the network.

If only the base station is equipped with the two-sided ML model, the base station may transmit a compression artificial neural network to the terminal.

If only the terminal is equipped with the two-sided ML model, the terminal may transmit a restoration artificial neural network to the base station.

If a specific server on the network is equipped with the two-sided ML model, the server may transmit the compression artificial neural network to the terminal and transmit the restoration artificial neural network to the base station.

Figure 4A:
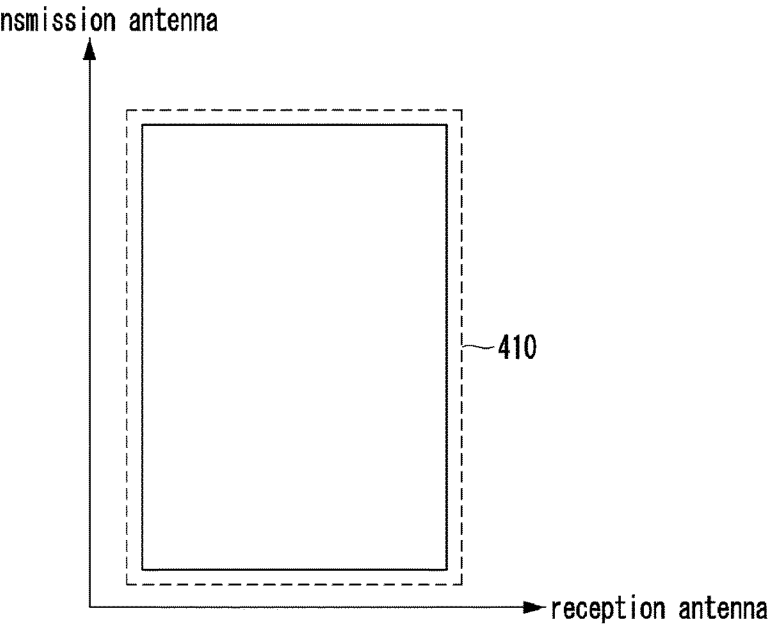
FIG. 4A is a conceptual diagram illustrating channel information in a single frequency unit.
Figure 4B:
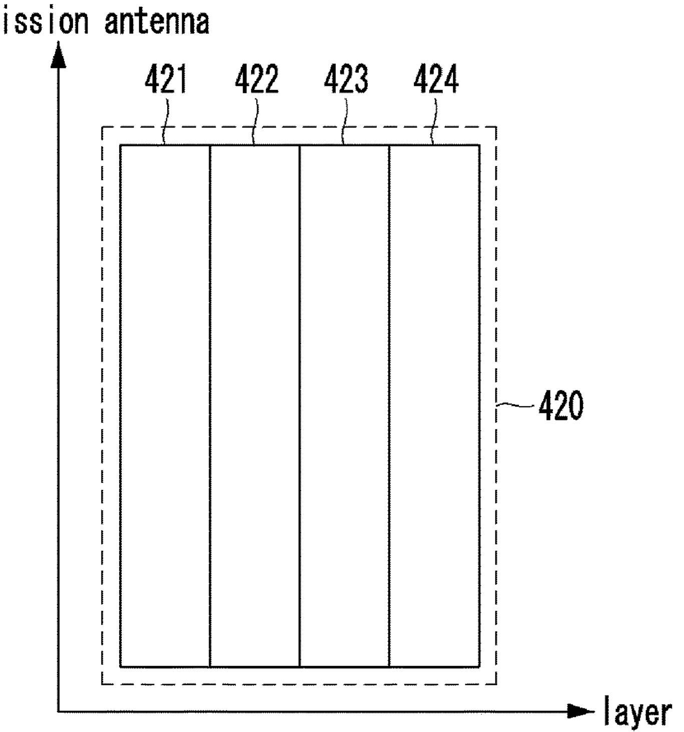
FIG. 4B is a conceptual diagram illustrating a precoding vector in a single frequency unit.
Figure 4C:
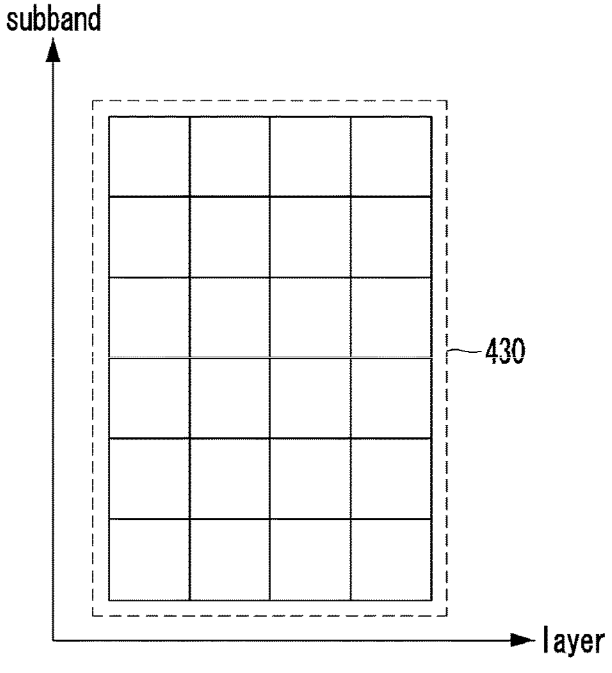
FIG. 4C is a conceptual diagram illustrating a precoding vector in a multi-frequency unit.

FIG. 4A is a conceptual diagram illustrating channel information in a single frequency unit, FIG. 4B is a conceptual diagram illustrating a precoding vector in a single frequency unit, and FIG. 4C is a conceptual diagram illustrating a precoding vector in a multi-frequency unit.

In FIG. 4A, a horizontal axis represents reception antennas, and a vertical axis represents transmission antennas. FIG. 4A illustrates channel information 410 at a single frequency, and may be a diagram illustrating that the channel information 410 increases in proportion to the number of transmission antennas and the number of reception antennas.

In FIG. 4B, a horizontal axis represents layers, and a vertical axis represents transmission antennas. FIG. 4B may be a diagram illustrating that precoding vector information 421, 422, 423, and 424 for the respective layers increase proportionally in proportion to the number of transmission antennas.

In FIG. 4C, a horizontal axis represents layers, and a vertical axis represents subbands. FIG. 4C may be a diagram illustrating that as multiple frequencies, that is, the respective subbands increase, the precoding vector information 421, 422, 423, and 424 for the respective layers increase proportionally.

Meanwhile, the input of the compression artificial neural network running in the terminal may be channel information or precoding matrix. When the channel information or precoding matrix is used as input, input information may be information on all frequencies, as illustrated in FIGS. 4A and 4B.

As another example, when channel information or precoding matrix is used as input, input information may be information for the respective unit frequencies, as illustrated in FIG. 4C. An example of a unit frequency may be a subband composed of a plurality of resource blocks (RBs). When a compression artificial neural network supporting a unit frequency as input is applied, compression of the entire frequency may be performed by repeatedly inputting the respective unit frequencies to compress information on the entire frequency.

When the input information is precoding information, the input information may be information on the entire layers or information on each individual layers. In this case, when an artificial neural network that compresses precoding information for individual layers is applied, to compress the entire precoding matrix composed of a plurality of layers, compression of the entire layers may be performed by inputting the respective layers.

Figure 5:
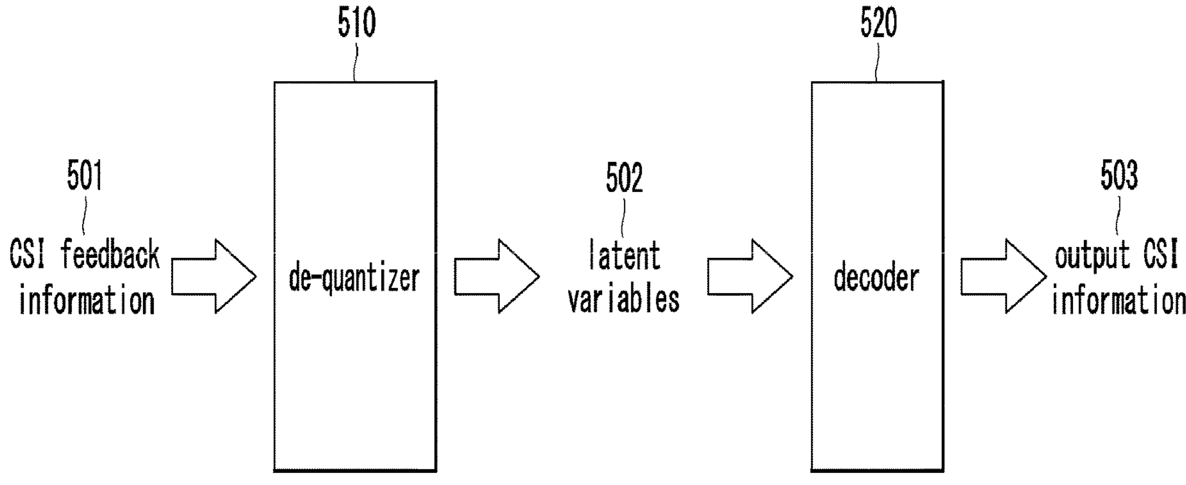
FIG. 5 is a conceptual diagram illustrating a CSI derivation procedure at a base station.

FIG. 5 is a conceptual diagram illustrating a CSI derivation procedure at a base station.

Before referring to FIG. 5, the procedure for transmitting CSI feedback information to the base station will be summarized once again. First, the base station may transmit a CSI-RS to the terminal at a preset periodicity or aperiodically. Accordingly, the terminal may receive and measure the CSI-RS transmitted by the base station. The terminal may transmit CSI feedback information to the base station based on the measured CSI-RS. In this case, the CSI feedback information transmitted by the terminal may be information in a binary form.

The configuration illustrated in FIG. 5 may be an example configuration for describing a CSI feedback information decoding procedure performed in the base station. Referring to FIG. 5, the base station may include a de-quantizer 510 and a decoder 520. The de-quantizer 510 may receive the CSI feedback information 501. As described above, the CSI feedback information 501 may be CSI feedback data in a binary form. The de-quantizer 510 may de-quantize the CSI feedback information 501 to generate and output latent variables 502. In this case, since the latent variables 502 have been de-quantized in the de-quantizer, they may be data in an unquantized state. The latent variables 502 may be input to the decoder 520. The decoder 520 may be a restoration artificial neural network according to the present disclosure. Accordingly, the decoder 520 may decode the CSI feedback information expressed as latent variables and generate output CSI feedback information 503. Here, the output CSI feedback information may include rank information, channel quality index (CQI), and precoding information.

For the operations described above, in the present disclosure, when the base station requests CSI feedback information from the terminal, the base station may indicate an output scheme of the compression artificial neural network that performs the operation of the encoder 310 of the terminal. In other words, the base station may indicate a quantization scheme of the output latent variables 302 when the compression artificial neural network of the terminal outputs. The base station may transmit quantization configuration information to the terminal in advance to indicate the quantization scheme of the output latent variables 302 of the compression artificial neural network. If there are two or more quantization schemes included in the quantization configuration information, the quantization configuration information may be transmitted as including reference numbers corresponding to the respective quantization schemes or indexes mapped to the respective quantization schemes. Assuming there are four quantization schemes, a format of the quantization configuration information may be configured as shown in Table 1 below.

TABLE 1

| Index (or reference number) | Quantization scheme/Information required for a quantization scheme |
|---|---|
| 00 | Quantization scheme #1/Information required for performing the quantization scheme #1 |

TABLE 1-continued

| Index (or reference number) | Quantization scheme/Information required for a quantization scheme |
|---|---|
| 01 | Quantization scheme #2/Information required for performing the quantization scheme #2 |
| 10 | Quantization scheme #3/Information required for performing the quantization scheme #3 |
| 11 | Quantization scheme #4/Information required for performing the quantization scheme #4 |

The base station may transmit the quantization configuration information as shown in Table 1 to the terminal in advance. When a specific quantization scheme is to be used based on the quantization configuration information provided to the terminal, the base station may indicate the specific quantization scheme by transmitting an index or reference number thereof to the terminal.

According to an exemplary embodiment of the present disclosure, it may be assumed that training of a two-sided ML model is performed at the base station. When performing training of the ML model at the base station, a distribution of latent variables for an input dataset may be known. Therefore, the base station may derive configuration information for quantization using the distribution of latent variables for the input dataset.

For example, the quantization schemes included in the quantization configuration information may correspond to information on codebooks for applying vector quantization. As another example, the quantization schemes included in the quantization configuration information may correspond to information on decision boundaries and representation values for applying non-uniform scalar quantization.

According to an exemplary embodiment of the present disclosure, when training of the two-sided ML model is performed at the base station, the base station may transmit a trained compression artificial neural network to the terminal in advance. In this case, quantization configuration information on which the training is based may be transmitted to the terminal together or additionally. Quantization that the terminal can perform based thereon may be one of the following.

Vector quantization configuration

Scalar quantization configuration

When the terminal performs vector quantization, information on a codebook consisting of latent variables corresponding to all binary CSI feedback information reports may be required.

The scalar quantization schemes may be classified into a uniform scalar quantization scheme and a non-uniform scalar quantization scheme. For the scalar quantization scheme, the number of quantized bits for each latent variable dimension may be included in the information required for the quantization scheme.

When the uniform scalar quantization scheme is used among the scalar quantization schemes, information on the quantization scheme may include information on a minimum value and a maximum value. When the non-uniform scalar quantization scheme is used among the scalar quantization schemes, information on the quantization scheme may include information of a decision boundary and representation value for quantization.

In case of the scalar quantization, quantization of the same size may be performed on all latent variable dimensions, or quantization configured differently for each dimension may be performed.

Figure 6:
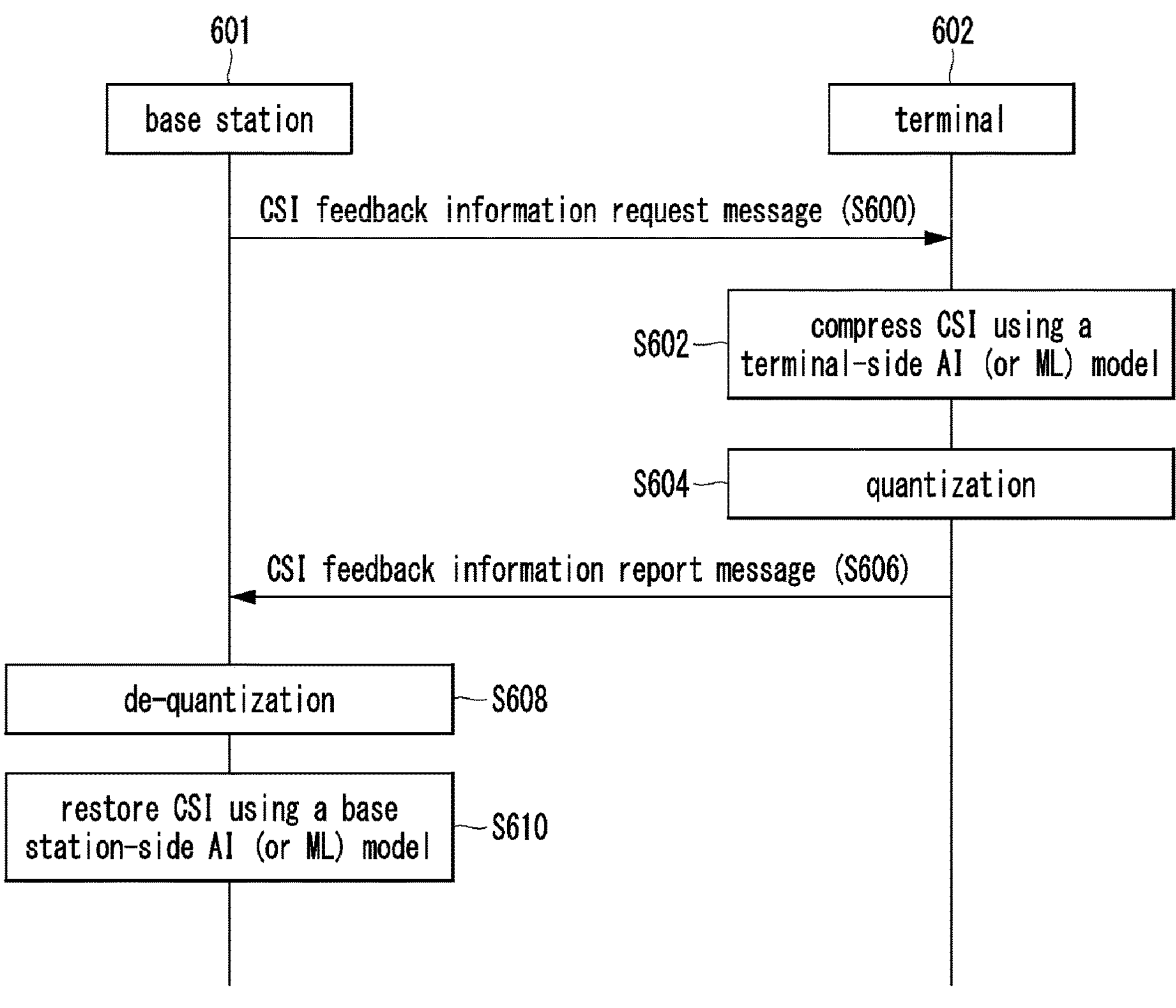
FIG. 6 is a sequence chart illustrating a procedure for transmitting a report message of quantized CSI feedback information and a procedure of obtaining CSI feedback information based on a CSI feedback information request.

FIG. 6 is a sequence chart illustrating a procedure for transmitting a report message of quantized CSI feedback information and a procedure of obtaining CSI feedback information based on a CSI feedback information request.

Referring to FIG. 6, a base station 601 and a terminal 602 are illustrated. Each of the base station 601 and the terminal 602 may include all or part of the components previously described in FIG. 2. In addition, it should be noted that FIG. 6 illustrates the base station 601 and the terminal 602 to describe a mobile communication system as an example. In other words, as described above, each of the base station 601 and the terminal 602 may be understood as being replaced with a first communication node and a second communication node in various types of wireless communication systems.

Meanwhile, it should be noted that in FIG. 6, the procedure for transmitting a CSI-RS for CSI measurement is omitted.

In a step S600, the base station 601 may transmit a CSI feedback information request message to the terminal 602. In general, the CSI feedback information request message may be a message requesting the terminal 602 to measure a CSI-RS and report a measurement result. The CSI feedback information request message according to the present disclosure may include quantization scheme information as described in Table 1 above. The quantization scheme may be one of the vector quantization configurations or various types of scalar quantization configurations as described above, and may include information required when performing the quantization scheme as described in Table 1 and below. In case of the vector quantization, a codebook for vector quantization may be information required when performing the corresponding quantization scheme. In addition, the CSI feedback information request message may indicate the corresponding quantization scheme through an index or reference number and information required for performing the quantization scheme, as described in Table 1. The quantization configuration information as shown in Table 1 may be transmitted in advance to the terminal 602 by the base station 601, as described above. The step S600 may be a procedure for indicating the terminal 602 to generate information on the quantization scheme of the latent variables 302 described in FIG. 3 and information required for performing the quantization scheme.

Therefore, in the step S600, the terminal 602 may receive the CSI request message including the above-described information.

In a step S602, the terminal 602 may perform CSI compression using a terminal-side AI model and/or ML model. The AI and/or ML model for compression of CSI feedback information may correspond to the encoder 310 previously described in FIG. 3.

In a step S604, the terminal 602 may perform quantization based on a quantization scheme required for the AI and/or ML model for compression of CSI feedback information. Here, the quantization scheme may be determined based on the index or reference number included in the CSI feedback information request message. In other words, the step S604 may be a procedure for performing quantization based on the quantization scheme described in Table 1 and generating information required for performing the quantization scheme.

For example, when the base station 601 requests vector quantization of an N-dimensional latent variable 302 with an M bit length through the quantization scheme indication in the CSI feedback information request message, the terminal 602 may convert the latent variables into a CSI feedback information reporting message having a length of M bits by using a codebook received from the base station 601 in advance.

As another example, when the base station 601 requests uniform quantization of D bits for each dimension on N-dimensional latent variables through the quantization scheme indication in the CSI feedback information request message, the terminal 602 may quantize a value of each dimension of the latent variables to D bits, and convert the entire dimension information of N×D bits into a CSI feedback information report message.

In a step S606, the terminal 602 may transmit the CSI feedback information report message to the base station 601. The CSI feedback information report message may be transmitted at a time for transmitting the CSI feedback information report message in response to reception of the CSI-RS. In addition, the CSI feedback information reporting message may be a binary CSI feedback.

Therefore, the base station 601 may receive the CSI feedback information report message from the terminal 602.

In a step S608, the base station 601 may de-quantize the binary CSI feedback information included in the CSI report message. In this case, the base station 601 may perform de-quantization based on the scheme indicated by the CSI feedback information request message. The de-quantization procedure may be performed by the de-quantizer 510 described in FIG. 5.

In a step S610, the base station 601 may restore CSI using the base station's AI and/or ML model.

In the above, the case where the base station trains the two-sided ML model and transmits quantization configuration information to the terminal has been described. In addition, FIG. 6 has described the procedure in which the base station requests CSI reporting using a specific quantization scheme based on the configuration information, and the terminal reports CSI based on the corresponding quantization scheme.

According to another exemplary embodiment of the present disclosure, the terminal or terminal-side server may transmit quantization configuration information for the CSI compression model to the base station in advance. Here, the server on the terminal side may be a server that performs the training operation on behalf of the terminal, and may be a server that is directly connected to the terminal or a server in the network, which can generate the configuration information for training of quantization for the CSI compression model on behalf of the terminal. Hereinafter, for convenience of description, the description will be made assuming that the training operation is performed in the terminal. However, it will be obvious to those skilled in the art that the terminal performing training may be replaced by the terminal-side server performing training on behalf of the terminal.

The terminal may generate quantization configuration information for the CSI compression model and transmit it to the base station. The configuration information may be transmitted in form of additional information of the CSI compression model, or may be transmitted through separate control signaling (e.g., RRC signaling, such as UE capability information). Therefore, the base station may store the quantization configuration information for the CSI feedback information compression model provided by the terminal. Afterwards, during a CSI feedback information request procedure, a CSI feedback information request may be performed based on the quantization configuration information for the CSI feedback information compression model provided by the terminal. Even at this time, as previously described in Table 1, the terminal may distinguish the quantization configuration information through an index or reference number. Therefore, the base station may specify the quantization configuration information using an index or reference number when requesting a CSI feedback information report.

Figure 7:
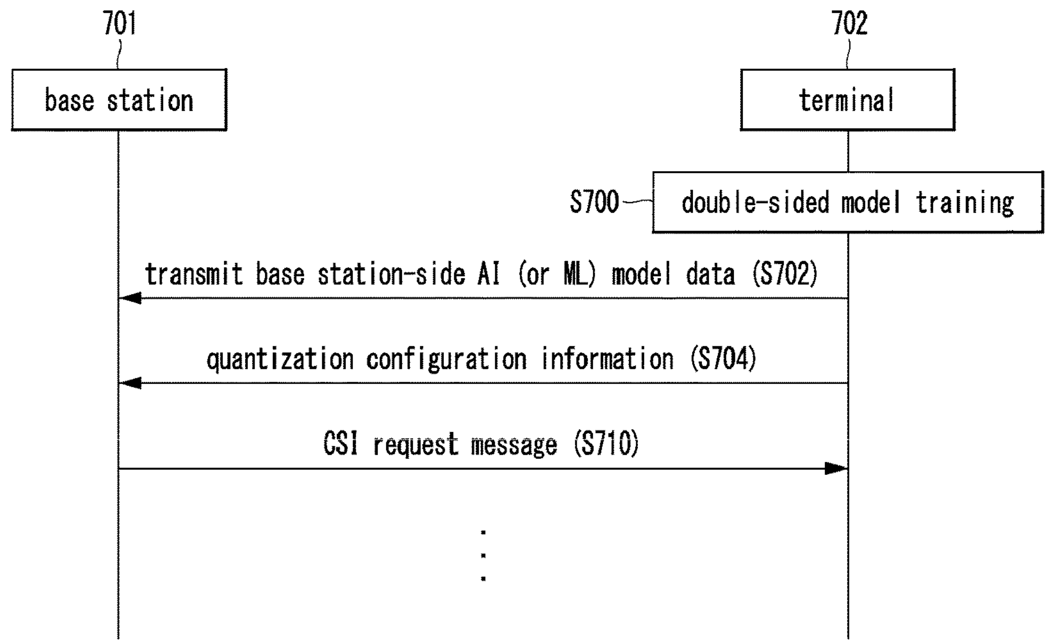
FIG. 7 is a sequence chart illustrating a procedure in which a request for CSI feedback information is made by a terminal performing two-sided model training and transmitting a base station-side model.

FIG. 7 is a sequence chart illustrating a procedure in which a request for CSI feedback information is made by a terminal performing two-sided model training and transmitting a base station-side model.

Referring to FIG. 7, a base station 701 and a terminal 702 are illustrated, and each of the base station 701 and the terminal 702 may include the same configuration as previously described in FIG. 6. Therefore, redundant description will be omitted.

In a step S700, the terminal 702 may perform two-sided model training. When performing two-sided model training, the terminal 701 may identify a distribution of latent variables for an input dataset. Therefore, the terminal 702 may derive quantization configuration information for quantization using the latent variable distribution. Examples of the quantization configuration information may be information on a codebook for applying vector quantization, or information on a decision boundary and representation value for applying non-uniform scalar quantization. In other words, it may be the information described in Table 1 above. Therefore, the terminal 702 may configure the quantization configuration information in the form shown in Table 1.

In a step S702, the terminal 702 may transmit base station-side AI and/or ML model data based on two-sided model training to the base station 701. Accordingly, the base station 701 may receive the base station-side AI and/or ML model data based on the two-sided model training from the terminal 702 in the step S702.

In a step S704, the terminal 702 may transmit the quantization configuration information generated in the step S700 to the base station 701. Therefore, the base station 701 may receive the quantization configuration information from the terminal 702.

In a step S706, the base station 701 may transmit a CSI feedback information request message to the terminal 702. Here, the CSI feedback information request message may be the same message as previously described in step S600 of FIG. 6. However, the only difference is that the indication using the quantization configuration information is based on the quantization configuration information received in the step S704.

It should be noted that the subsequent procedure is the same as previously described in FIG. 6, and illustration thereof is omitted in FIG. 7.

Meanwhile, when the above-described operation is performed on the terminal-side server, the steps S700 to S704 may be performed in the terminal-side server. The operations after the step S710 may be performed between the terminal 702 and the base station 701. In addition, an additional procedure in which the terminal-side server transmits the terminal-side AI and/or ML model to the terminal 702 and transmits quantization configuration information to the terminal 702 may be required. However, if the terminal 702 already has the terminal-side AI and/or ML model and quantization configuration information, the procedure for the terminal-side server to transmit the corresponding information to the terminal 702 may be omitted.

Meanwhile, in the present disclosure, a range of output values of the compression artificial neural network may be limited to a specific range. For example, the specific range may be limited to a value between 0 and 1. A case where the output value range of the compression artificial neural network of the terminal is limited to a specific range will be described.

According to an exemplary embodiment of the present disclosure, when configuring a uniform quantization scheme of scalar quantization, the base station may configure quantization configuration information using only information on the number of quantized bits for each dimension or information of a size of the CSI feedback information report. In this case, one of the schemes below may be applied to limit the range of output values of the artificial neural network.

Apply a sigmoid function as an activation function of an output node.

Convert a value of the output node to a value by applying a cumulative distribution function (CDF)

If the scheme of converting the value of the output node to a value by using a CDF is applied, quantization configuration information including information on a distribution for each dimension or information on a mean and variance for Gaussian approximation of the distribution may need to be transmitted to the terminal, or may need to be transmitted from the terminal to the base station.

Figure 8A:
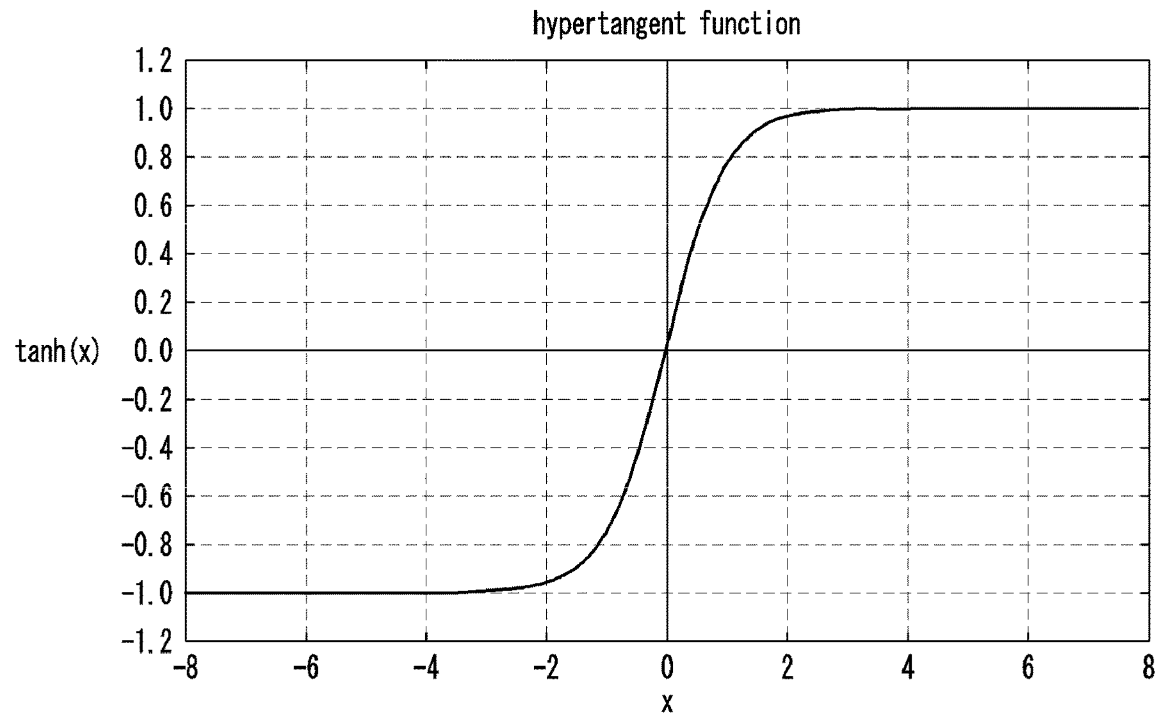
FIG. 8A is a diagram illustrating a graph of a hyperbolic tangent function as an example of a sigmoid function for limiting a range of output values of compression artificial neural network.
Figure 8B:
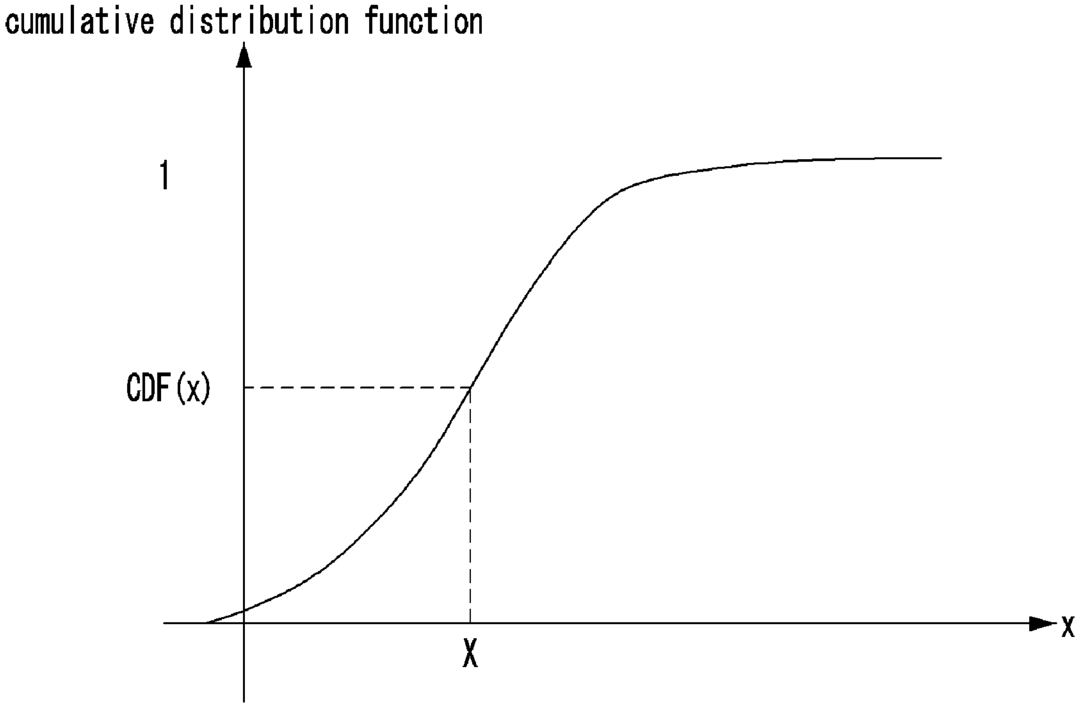
FIG. 8B is a diagram illustrating a graph of a cumulative distribution function (CDF) for limiting a range of output values of compression artificial neural network.

FIG. 8A is a diagram illustrating a graph of a hyperbolic tangent function as an example of a sigmoid function for limiting a range of output values of compression artificial neural network, and FIG. 8B is a diagram illustrating a graph of a cumulative distribution function (CDF) for limiting a range of output values of compression artificial neural network.

Referring to FIG. 8A, when a value x is 0 or more, a value of a hyperbolic tangent (tanh) function has a value between '0' and '1'. However, if the x value is negative, the hyperbolic tangent (tanh) function value has a value between '0' and '−1'.

It can be seen that the CDF of FIG. 8B has a similar form to the hyperbolic tangent function of FIG. 8A for positive values.

According to an exemplary embodiment of the present disclosure, it may be assumed that the base station trains a two-sided ML model and applies the CDF illustrated in FIG. 8B to a value of an output node. In this case, the base station may transmit the trained compression artificial neural network and information on a distribution of latent variables to the terminal. After delivering the information, the base station may request a CSI feedback information report from the terminal. In this case, the base station may indicate to the terminal quantization configuration information using only information on the number of quantized bits for each dimension.

For example, the base station may request the terminal to quantize all N-dimensional latent variables into D bits. Accordingly, the terminal receiving may convert the output value of the compression artificial neural network to a value between 0 and 1 by applying the CDF. The terminal may quantize the converted value into D bits by applying the CDF. Then, the terminal may generate a CSI feedback information report message with N*D bits for information of all dimensions, and transmit the CSI feedback information report message to the base station.

The base station may receive the CSI feedback information report message transmitted by the terminal. The base station may obtain CSI feedback information from the received CSI feedback information report message. The base station may perform de-quantization of the CSI feedback information for each dimension. Additionally, the base station may restore the latent variables by applying an inverse CDF to the de-quantized values for each dimension. Then, the base station may obtain (or decompress) the final CSI by inputting the restored latent variables into a restoration artificial neural network.

According to another exemplary embodiment of the present disclosure, the base station may limit the range of the value of output node using a hyperbolic tangent (tanh) activation function. In this case, when the base station requests a CSI report from the terminal, the base station may specify a payload size M of the entire CSI report.

For example, when the dimensionality of the latent variables is N and the payload size M of the CSI report is specified, the terminal may derive the number of quantized bits for each dimension according to Equation 1 below.

$$d_i = \text{floor}(M/N)+1 \text{ for } i=0, \ldots, \text{mod}(M,N)=$$

$$d_i = \text{floor}(M/N) \text{ for } i=\text{mod}(M,N)+1, \ldots, M-1 \quad \text{[Equation 1]}$$

The terminal may apply the hyperbolic tangent (tanh) function to the value of the output node to limit the range, then quantize information of each dimension using the number $d_i$ of quantized bits derived for each dimension to generate the CSI report of the total length M. The terminal may transmit a CSI report message including the generated CSI report information of the total length M to the base station. Therefore, the base station may receive the CSI report message and obtain the CSI report information of the total length M included in the received CSI report message.

The base station may perform de-quantization on the CSI reporting information of the total length M using the number of quantized bits for each dimension derived by the terminal. Then, the latent variables may be restored by applying a tangent (tan) function, which is an inverse function of the hyperbolic tangent (tanh) function, to the de-quantized values. When restoration of the latent variables is completed, the base station may obtain (or decompress) the final CSI by inputting the restored latent variables into the restoration artificial neural network. The restoration of the latent variables by applying the inverse function of the function used for limiting the range (e.g., the tangent function, which is an inverse function of the hyperbolic tangent function) may not be performed.

[2] Method of Supporting Various Numbers of Subbands and Layers

According to an exemplary embodiment of the present disclosure, when CSI is fed back based on an AI model and/or ML model in a mobile communication system consisting of a base station and a terminal, feedback may be performed with respect to a plurality of subbands and a plurality of layers. In this case, when requesting a CSI feedback information report from the terminal, the base station may specify an input unit of the artificial neural network as one of the following.

Individual subband, individual layer

All subbands, individual layer

Individual subband, all layers

All subbands, all layers

If there is only one artificial neural network configured and activated in the terminal, or if it is clear that only one input unit of the artificial neural network is supported, the specifying of the input unit may be omitted.

Figure 9A:
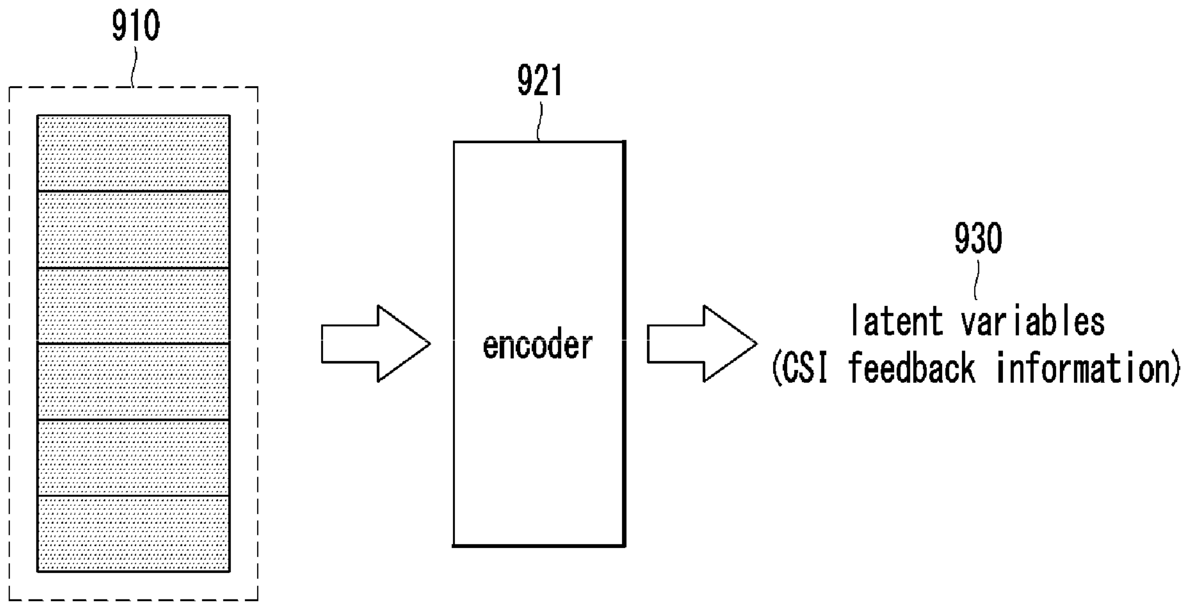
FIG. 9A is a conceptual diagram illustrating input and output when an input of a terminal-side encoder has a unit of all subbands.
Figure 9B:
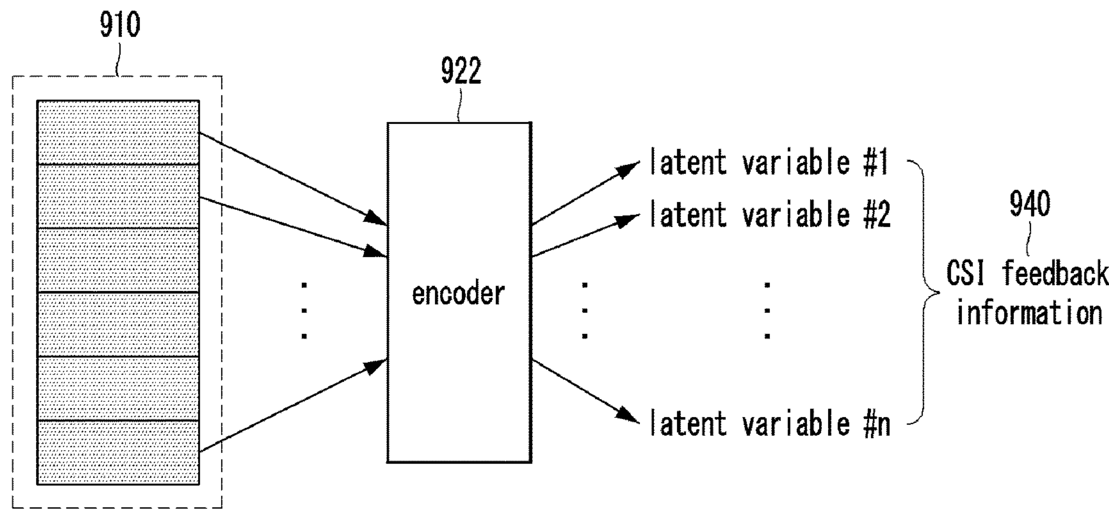
FIG. 9B is a conceptual diagram illustrating input and output when an input of a terminal-side encoder has a unit of an individual subband.

FIG. 9A is a conceptual diagram illustrating input and output when an input of a terminal-side encoder has a unit of all subbands, and FIG. 9B is a conceptual diagram illustrating input and output when an input of a terminal-side encoder has a unit of an individual subband.

Referring to FIG. 9A, a case where the entire CSI feedback information measured on all subbands 910 is input to an encoder 921 at once is illustrated. For example, when all the subbands 910 are composed of n subbands, the CSI feedback information measured for n subbands may be input to the encoder 921. Here, the encoder 920 may correspond to the encoder 311 illustrated in FIG. 3. In other words, it may be an encoder provided in the terminal. The encoder 921 may output latent variables 930 by encoding the CSI feedback information measured for the subbands in a predetermined manner. In this case, the output latent variables 930 may correspond to the latent variables 302 described in FIG. 3. Since the CSI feedback information for all subchannels 910 is encoded, the latent variables 930 may correspond to CSI feedback information transmitted from the terminal to the base station.

Referring to FIG. 9B, an encoder 922 may be an encoder that is not able to encode values of all subbands at once. Therefore, an input of the encoder 922 may be a value for each subband. The encoder 922 may be a partial component of the encoder 310 previously described in FIG. 3.

As in the previous example of FIG. 9A, when all subbands 910 are composed of n subbands, each of the n subbands may be an individual input to the encoder 922. Therefore, when a CSI value measured for a subband #1 is input, the encoder 922 may output a latent variable #1 based on a predetermined encoding scheme. When a CSI value measured for a subband #2 is input, the encoder 922 may output a latent variable #2 based on the predetermined encoding scheme. In the same manner, when a CSI value measured for a subband #n is input, the encoder 922 may output a latent variable #n based on the predetermined encoding scheme. In other words, the encoder 922 may output the latent variable for each subband. Therefore, CSI feedback information 940 may be generated through a process of aggregating all latent variables.

Figure 10:
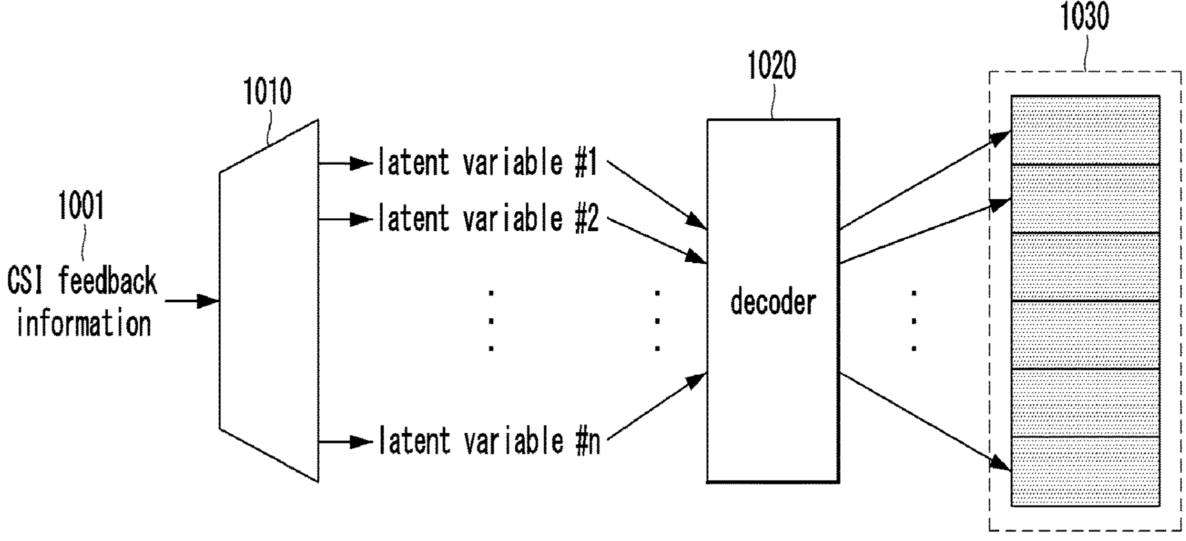
FIG. 10 is a conceptual diagram illustrating a procedure for deriving CSI for each subband at a base station based on CSI feedback information.

FIG. 10 is a conceptual diagram illustrating a procedure for deriving CSI for each subband at a base station based on CSI feedback information.

FIG. 10 illustrates a configuration and/or procedure of a base station for receiving CSI feedback information configured for each subband, as shown in FIG. 9B described above.

Referring to FIG. 10, received CSI feedback information 1001 may have a form obtained by aggregating latent variables for the respective subbands, as described in FIG. 9B. The CSI feedback information may be input to a decomposer 1010. The decomposer 1010 may decompose the CSI feedback information in which latent variables for subbands are aggregated into latent variables corresponding to the respective subchannels. In other words, the latent variable #1 corresponding to the subband #1, latent variable #2 corresponding to the subband #2, . . . , and latent variables #n corresponding to the subband #n may be obtained. These decomposed latent variables may be input to a decoder 1020. Here, the decoder 1020 may correspond to the decoder 320 previously described in FIG. 3. The decoder 1020 may decode and output each latent variable into CSI feedback information corresponding to each subband.

According to an exemplary embodiment of the present disclosure, when feedback for N subbands and L layers is required, the base station may specify an input unit as an individual subband and an individual layer. In this case, the terminal may input channel information or precoding matrix for each subband and each layer unit to the compression artificial neural network. Therefore, latent variables corresponding to the channel information or precoding matrix for individual subband and individual layer may be obtained. When the terminal obtains latent variables for all individual subbands and individual layers, the terminal obtain CSI feedback information, which is a reporting unit of N×L in which the latent variables are combined. The CSI feedback information may be included in a CSI feedback report message and transmitted by the terminal to the base station.

Therefore, the base station may receive the entire CSI feedback information by obtaining the CSI feedback information included in the CSI feedback report message. Here, since the CSI feedback information has a form of aggregating the individual subbands and individual layers as described above, it may be decomposed into individual CSI feedback information. In other words, the latent variables for individual subbands and individual layers may be obtained. The individual CSI feedback information may be restored (or obtained) by using a restoration artificial neural network to decompress the obtained latent variables. By aggregating all the individual CSI feedback information, the base station may construct the entire CSI feedback information.

Figure 11:
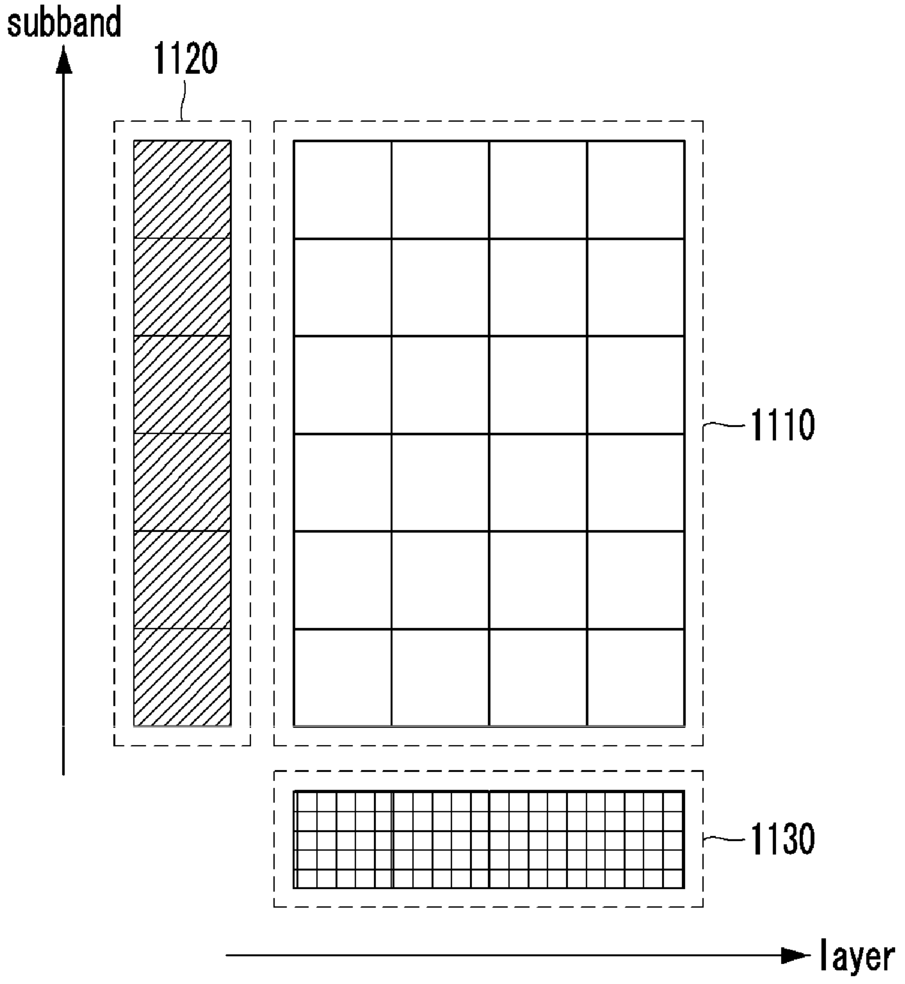
FIG. 11 is a conceptual diagram illustrating common information of subbands and layers.

FIG. 11 is a conceptual diagram illustrating common information of subbands and layers.

Referring to FIG. 11, a horizontal axis represents layers, and a vertical axis represents subbands. Communication between the terminal and the base station may be performed using a resource 1110 corresponding to a layer and a subband. The base station may request CSI feedback information for the resource 1110, and the terminal may report CSI feedback information for the resource 1110 to the base station.

According to an exemplary embodiment of the present disclosure, the base station may separately request common information 1130 of all subbands from the terminal. In response to the base station's request, the terminal may separately generate the common information 1130 and each individual CSI feedback information and transmit them to the base station. In this case, the common information 1130 of all subbands may be an average value of channel information of all subbands. Therefore, individual subband information may be expressed as a difference between the channel information of each individual subband and the common information 1130 of all subbands.

In the same manner, the base station may separately request common information 1120 of all layers from the terminal. In response to the base station's request, the terminal may separately generate the common information 1120 and each individual CSI feedback information and transmit them to the base station. In this case, the common information 1120 of all layers may be an average value of all precoding matrices. Therefore, individual layer information may be expressed as a difference between the individual layer information and the common information 1120 of all layers.

The base station may restore the received common information 1120 and 1130 and each individual CSI, and then use them to restore the CSI feedback information of each subband and each layer. In other words, the base station may restore individual CSI feedback information using the entire layer common information 1120, the entire subchannel common information 1130, and individual CSI feedback information reported by the terminal. In addition, the terminal may restore (obtain) the CSI feedback information of all subbands using the individual CSI feedback information.

According to another exemplary embodiment of the present disclosure, final CSI of all subbands and all layers may be obtained using an additional restoration artificial neural network to which the individual CSI feedback information restored by the base station is input.

Figure 12:
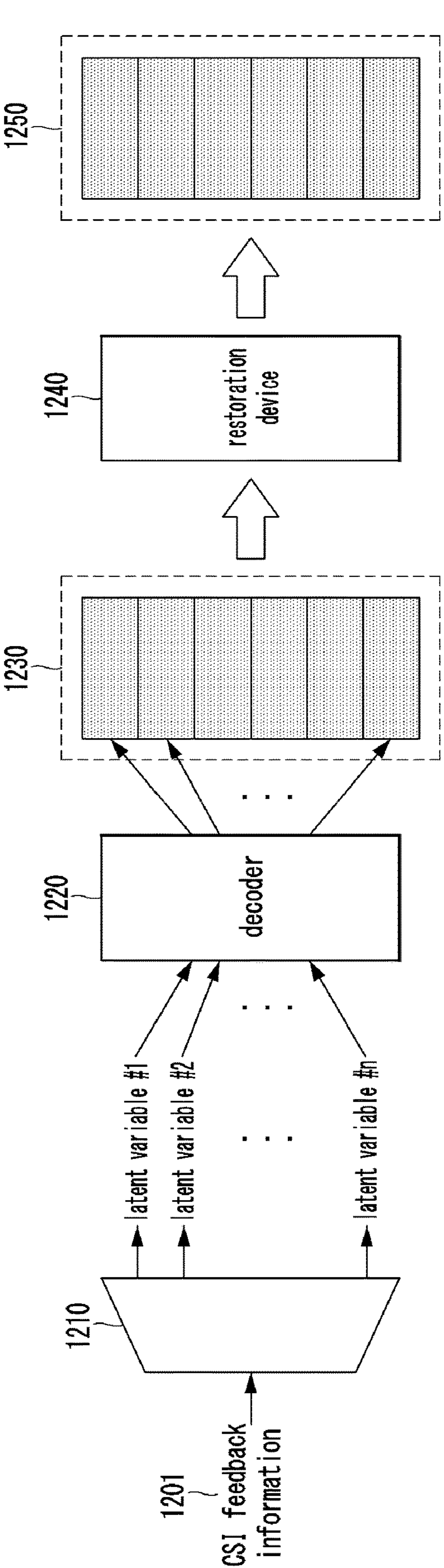
FIG. 12 is a conceptual diagram illustrating a model for performing a final CSI feedback information restoration procedure at a base station by using an additional restoration artificial neural network.

FIG. 12 is a conceptual diagram illustrating a model for performing a final CSI feedback information restoration procedure at a base station by using an additional restoration artificial neural network.

Referring to FIG. 12, received CSI feedback information 1201 may have a form of aggregating the common information 1120 of all layers and/or the common information 1130 of all subbands described in FIG. 11 and latent variables for the respective subbands. The CSI feedback information may be decomposed into latent variables for the respective subbands in a decomposer 1210. Here, the common information 1120 of all layers and/or the common information 1130 of all subbands may also be decomposed correspondingly. This may have a different form from that described in FIG. 10.

If the common information 1130 of all subbands is transmitted together with the individual subband information, the latent variable #1 or latent variable #n may be the common information 1130 of all subbands.

As another example, when the common information 1120 of all layers is transmitted together with individual layer information, the latent variable #1 or latent variable #n may be the common information 1120 of all layers.

If the common information 1120 of all layers and the common information 1130 of all subbands are received together with the latent variables of all individual CSI feedback information, at least one of the latent variables may become a latent variable for the common information 1120 of all layers and the common information 1130 of all subbands.

The decomposed latent variables may be input to a decoder 1220. Here, the decoder 1220 may correspond to the decoder 320 previously described in FIG. 3. The decoder 1220 may decode each latent variable into CSI feedback information corresponding to each subchannel, and output the CSI feedback information.

Unlike FIG. 10, a restoration device 1240 may be additionally included in FIG. 12. The restoration device 1240 according to the present disclosure may be an additional restoration artificial neural network that takes individual subband CSI feedback information as input. Through this, the final CSI feedback information 1250 may be restored.

According to another exemplary embodiment of the present disclosure, the base station may request the terminal to generate and report CSI feedback information on an individual subband and/or individual layer basis. When the base station requests CSI feedback information of some subbands and/or some layers among all subbands and all layers, the terminal may transmit CSI feedback information of some subbands and/or some layers to the base station based on the CSI feedback information request. The base station may use the CSI feedback information of some subbands and/or some layers to obtain final CSI for all subbands and layers. In this case, as a method of specifying some subbands and/or layers among all subbands and layers, the base station may use information on a common start and an interval for subbands and/or layers, or information on a start and an interval of subbands for each layer.

The case of performing the above-described procedure will be described with reference to the attached drawings.

Figure 13:
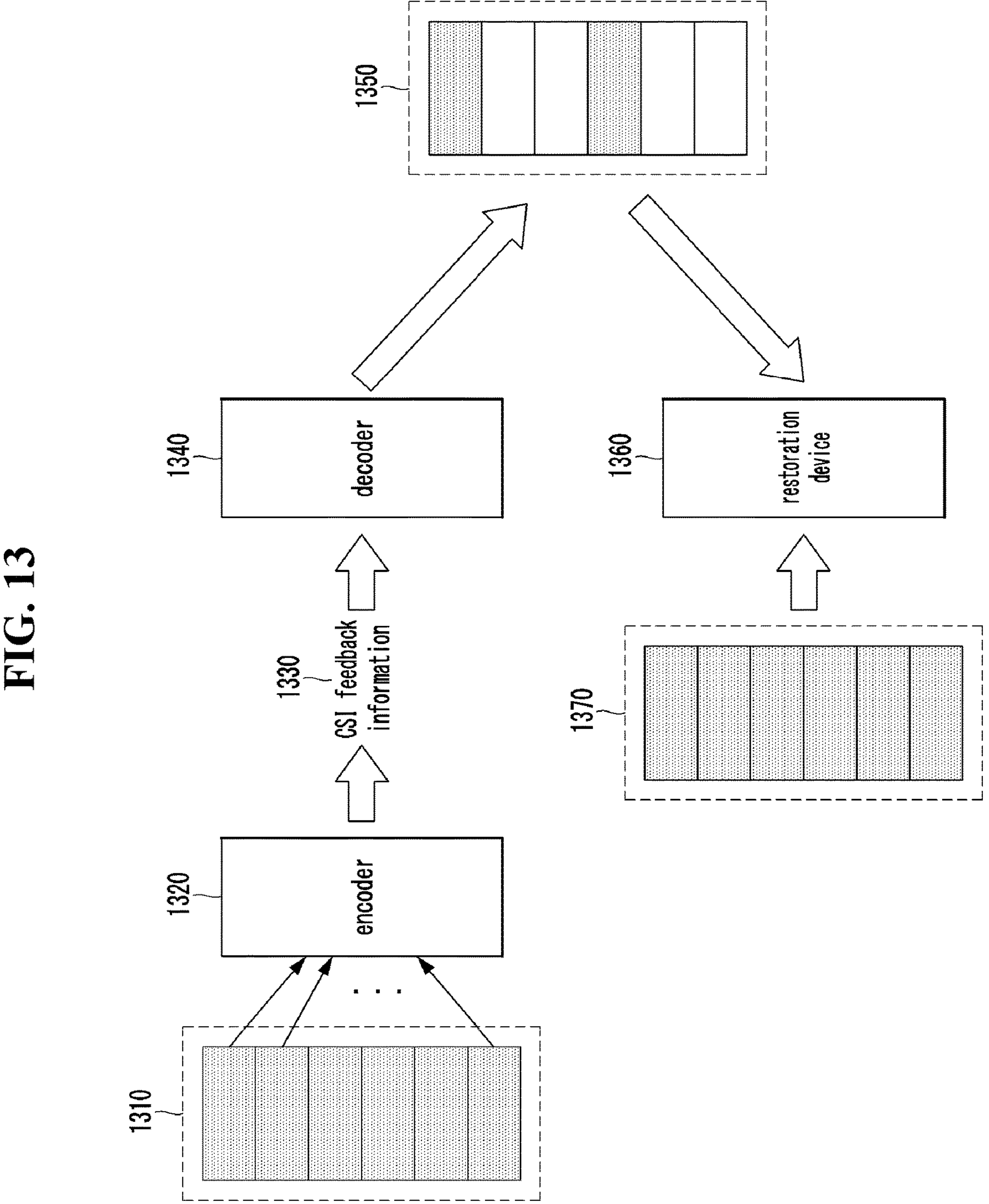
FIG. 13 is a conceptual diagram illustrating final CSI acquisition at a base station when a terminal reports information on some subbands and some layers as CSI feedback information.

FIG. 13 is a conceptual diagram illustrating final CSI acquisition at a base station when a terminal reports information on some subbands and some layers as CSI feedback information.

Before referring to FIG. 13, it is assumed that, as described above, the base station has indicated the terminal to generate and report CSI feedback information on an individual subband and/or individual layer basis through a CSI feedback information request message.

In addition, if the base station wishes to obtain CSI information for 6 subbands and 2 layers using CSI feedback information in individual subbands and individual layers, 6×2 unit CSI feedback information need to be transmitted. To effectively reduce this, the base station may set a start and an interval to 0 and 6, respectively, for the first layer, and set a start and an interval to 3 and 6, respectively, for the second layer, so that unit CSI feedback information for the four subbands are delivered.

The terminal may generate CSI feedback Information for some subbands among all subbands 1310, that is, four individual subbands, based on the CSI feedback information report request message received from the base station as described above. Then, the terminal may input CSI for four individual subbands to an encoder 1320 and generate CSI feedback information 1330 for the corresponding subbands. The generated CSI feedback information may be transmitted to the base station as being included in a CSI feedback message. Accordingly, the CSI feedback information 1330 may include the CSI for four individual subbands.

When the base station receives the CSI feedback message including the CSI feedback information for four individual subbands, the base station may obtain CSI 1350 for the four individual subbands using the decoder 1340. In FIG. 13, reference numeral 1350 illustrates a case in which CSI feedback information is obtained for some hatched subbands among all subbands. Then, the base station may input the four individual CSI feedback information to a restoration device 1360 according to the present disclosure. Here, the restoration device 1360 according to the present disclosure may be a device using an additional restoration artificial neural network. The restoration device 1360 may obtain restored CSI information 1370 for all subbands and all layers using the four individual CSI feedback information.

[3] Decentralized Training Method

According to an exemplary embodiment of the present disclosure, a base station and a terminal may train a two-sided ML model and/or two-sided AI model in decentralized fashion. The base station or terminal may transmit a training request for a two-sided ML model and/or two-sided AI model to the other side. In other words, the base station may request the terminal to train a two-sided ML model and/or two-sided AI model, and similarly, the terminal may request the base station to train a two-sided ML model and/or two-sided AI model.

The terminal and/or base station receiving the training request may deliver a response to the side (i.e., source side) that requested training. The training request delivered from the source side to the other side may include the following information.

- Decentralized training scheme for two-sided ML model
  - Distributed training
  - Sequential training
  - Parallel training
- Artificial neural network and training dataset structure
  - Type and size of input of a terminal artificial neural network and output of a base station artificial neural network
  - Representation scheme of input of a terminal artificial neural network and output of a base station artificial neural network
  - Latent variable dimensionality
  - Respresentation scheme of latent variables
  - Equivalence of input and output Additionally, the response delivered from the counterpart side to the source side may include the following information.

Whether it is possible to perform training

Reason for not being able to perform training (when training is not possible)

Artificial neural network structure not supported

Unable to obtain training dataset, etc.

Figure 14A:
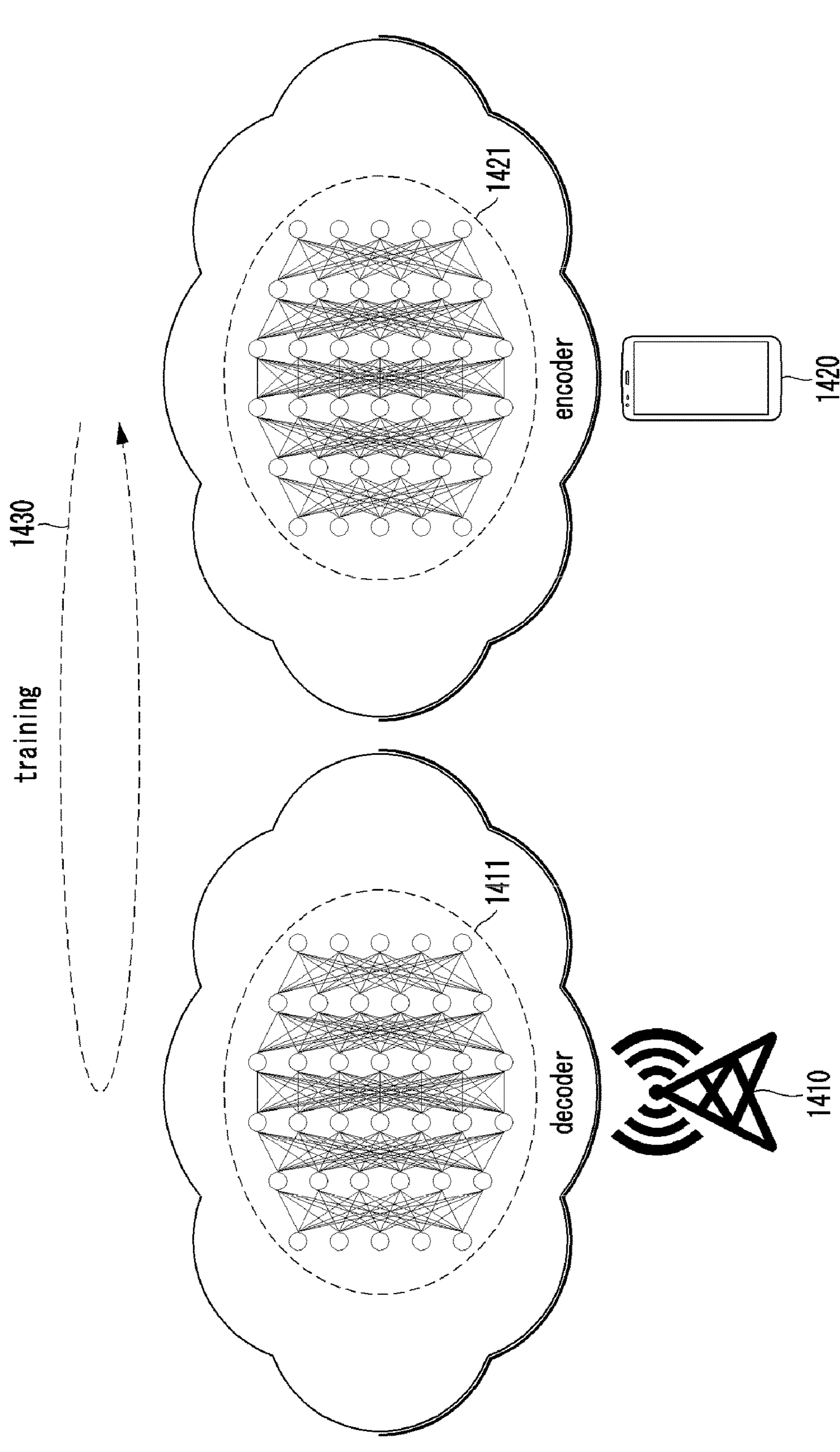
FIG. 14A is a conceptual diagram illustrating sequential learning of AI or ML between a base station and a terminal.
Figure 14B:
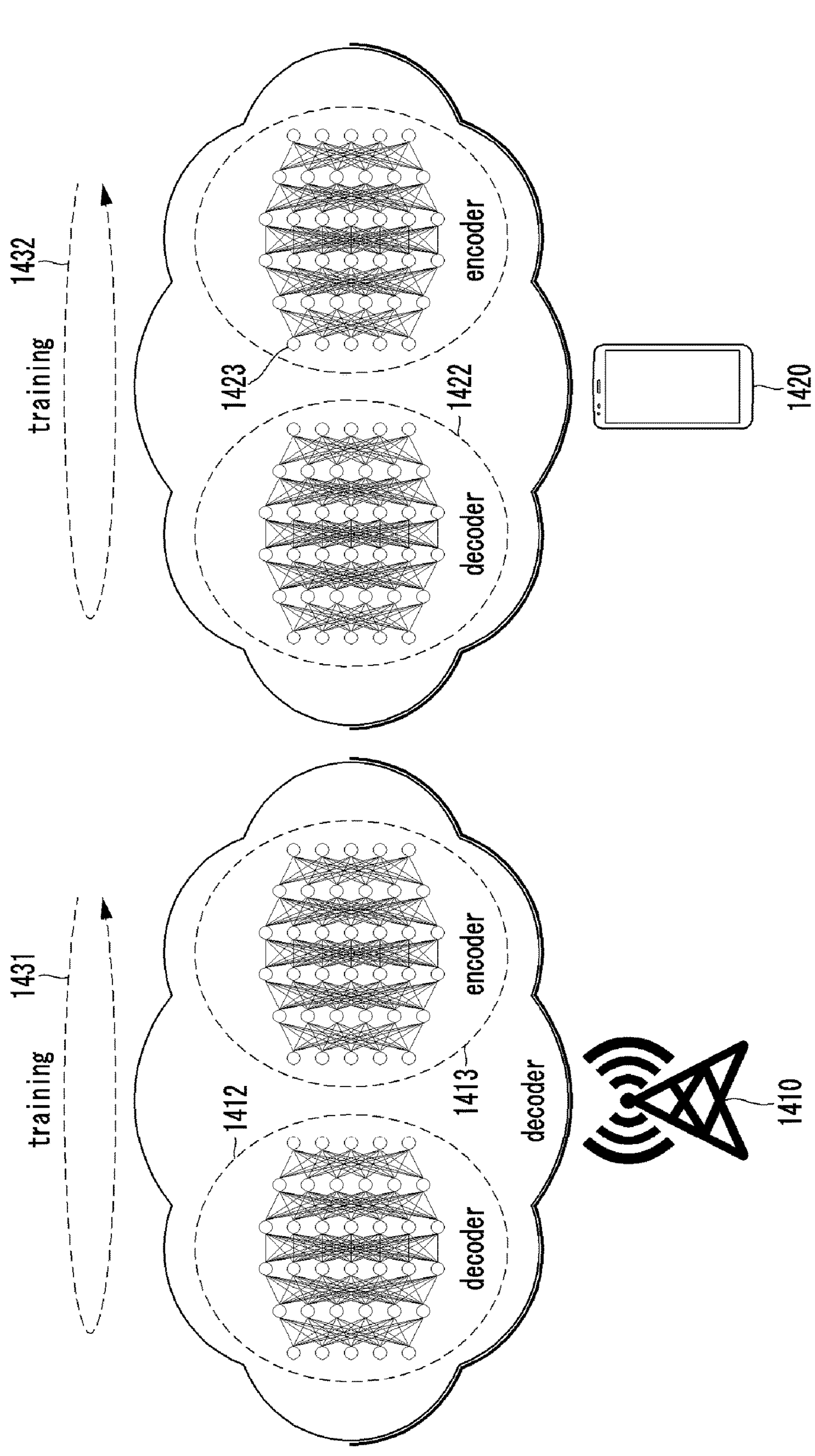
FIG. 14B is a conceptual diagram illustrating sequential/parallel learning of AI or ML between a base station and a terminal.

FIG. 14A is a conceptual diagram illustrating sequential learning of AI or ML between a base station and a terminal, and FIG. 14B is a conceptual diagram illustrating sequential/parallel learning of AI or ML between a base station and a terminal.

Referring to FIG. 14A, a base station 1410 may include a decoder 1411. The decoder 1411 may be an AI model and/or ML model according to the present disclosure. The terminal 1420 may include an encoder 1421. The encoder 1421 may be an AI model and/or ML model according to the present disclosure. In the following description, it will be assumed that each of the decoder 1411 and the encoder 1421 is an AI model.

FIG. 14A illustrates a case where sequential learning 1430 is performed upon a request by the terminal. In other words, the terminal 1420 may request training of an AI model for reporting CSI feedback information to the base station 1410. Accordingly, the base station 1410 may transmit a training response to the terminal 1420. Thereafter, the terminal 1420 may perform training of the encoder 1421 and then transmit training data to the base station 1410. Accordingly, the base station 1410 may train the decoder 1411 based on the training data. Then, the base station 1410 may transmit a training response to the terminal. In this above-described manner, sequential learning of the AI models may be performed between the base station 1410 and the terminal 1410.

Referring to FIG. 14B, the base station 1410 may include a decoder 1412 and an encoder 1413. The decoder 1411 and the encoder 1413 may be AI models and/or ML models according to the present disclosure. The terminal 1420 may include a decoder 1422 and an encoder 1423. The decoder 1422 and the encoder 1423 may be AI models and/or ML models according to the present disclosure. As illustrated in FIG. 14B, the base station 1410 may further include not only the decoder 1412 that the base station needs to have, but also the encoder 1413 that the terminal needs to have. Similarly, the terminal 1420 may further include the encoder 1423 that the terminal needs to have as well as the decoder 1422 that the base station needs to have. Therefore, the decoders 1412 and 1422 included in the base station 1410 and the terminal 1420 may be the same AI model, and the encoders 1413 and 1423 included in the base station 1410 and the terminal 1420 may also be the same AI model.

Accordingly, the base station 1410 may perform AI model training 1431 within the base station, and the terminal 1420 may perform AI model training 1432 within the terminal.

The operations of FIGS. 14A and 14B described above will be described in more detail.

Figure 15:
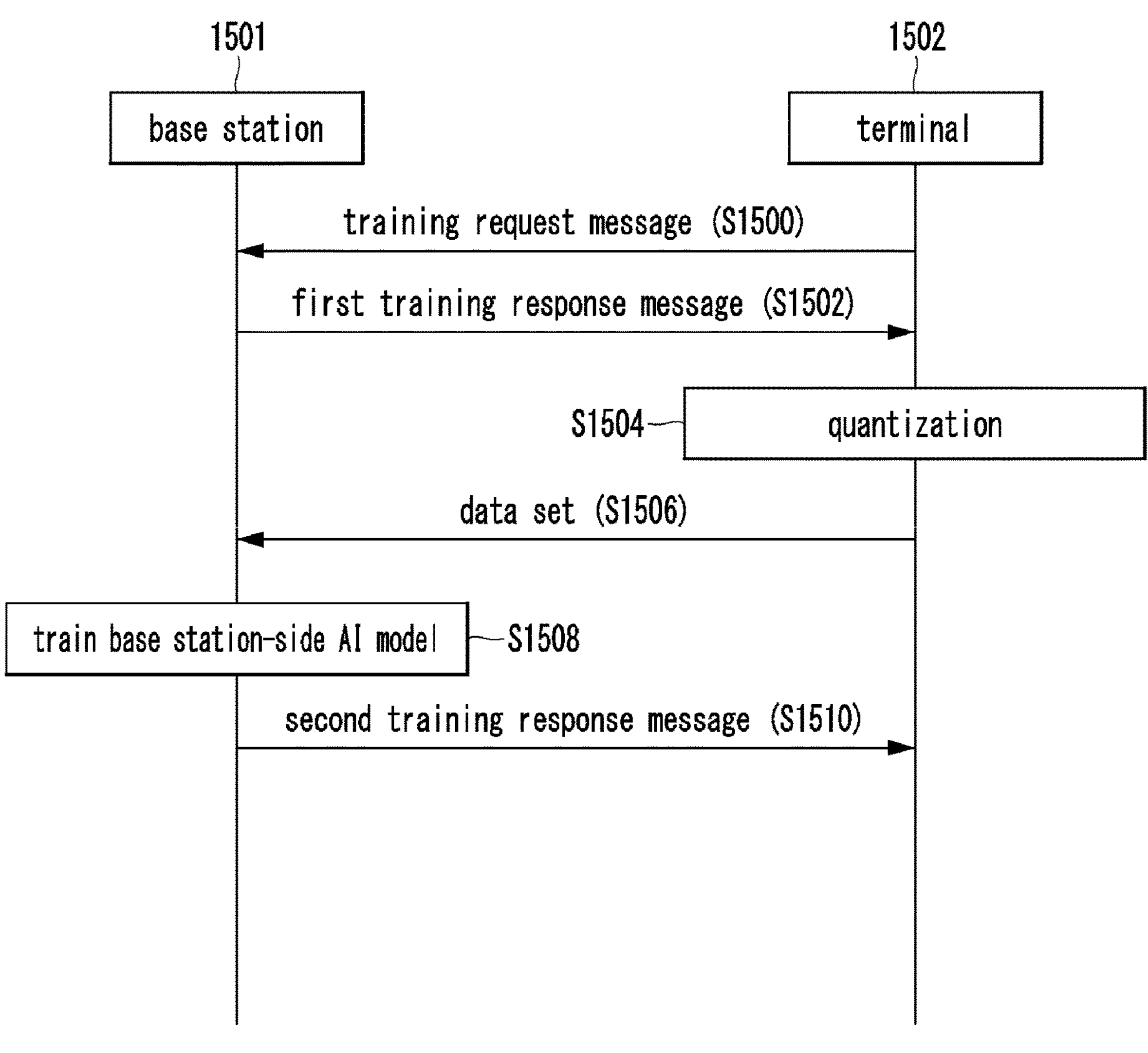
FIG. 15 is a sequence chart illustrating a sequential training procedure of AI model for transmitting and receiving CSI feedback information.

FIG. 15 is a sequence chart illustrating a sequential training procedure of AI model for transmitting and receiving CSI feedback information.

Referring to FIG. 15, a base station 1501 and a terminal 1502 are illustrated. Each of the base station 1501 and the terminal 1502 may include all or part of the components previously described in FIG. 2. Further, it should be noted that FIG. 6 illustrates the base station 1501 and the terminal 1502 to described a mobile communication system as an example. In other words, as described above, the base station 1501 and the terminal 1502 may be understood as being replaced with a first communication node and a second communication node, respectively, in various types of wireless communication systems.

When the terminal 1502 wants to start two-sided AI model training through sequential training, the terminal 1502 may configure information on a training type, for example, whether the training type of the artificial neural network is sequential training or parallel training. In addition, the terminal 1502 may configure information related to the training type of the artificial neural network. For example, the information related to the training type of the artificial neural network may be configured as follows.

a. Input type: precoding vector b. Input dimension: [Number of transmission antennas×2]

c. Input representation scheme: float32 d. Latent dimension: [16×1]

e. Latent representation scheme: float32

As illustrated above, the input type of the terminal artificial neural network may be set to, for example, a precoding vector of an individual subband. Additionally, the terminal 1502 may determine the input dimension to be twice the number of transmission antennas. If the number of transmission antennas is 32, the input dimension of the terminal artificial neural network may be 64 dimensions. As a result, this may be specified according to a precoding vector of each subband. Additionally, the input dimension of the terminal artificial neural network may be the same as the output dimension of the base station artificial neural network.

Additionally, the terminal 1502 may determine the size of the dimension of the latent variable, and the dimension size of the latent variable may be determined to be, for example, 16 dimensions. Additionally, the terminal 1502 may determine the representation schemes of the output and latent variables of the base station-side artificial neural network in a dataset, for example, float32.

In the exemplary embodiment of FIG. 15, a case where the terminal 1502 triggers a training request, that is, the terminal 1502 transmits a training request message to the base station 1501 will be described. However, for the opposite case to FIG. 15, that is, a case where the base station 1501 transmits a training request message to the terminal 1502, the procedures may be performed similarly based on the description of FIG. 15.

In a step S1500, the terminal 1502 may transmit to the base station 1501 a training request message including at least one of the training type of the artificial neural network described above and information related to the training type of the artificial neural network (i.e. a to e). Therefore, the base station 1501 may receive the training request message from the terminal 1502 in the step S1500.

In a step S1502, the base station 1501 may identify whether training can be performed based on the received training request message, and transmit a first training response message including information on whether training can be performed to the terminal 1502. If training is impossible, the first training response message may include a reason. For convenience of description, the following description assumes a case where the base station 1501 transmits the first training response message indicating that training is possible to the terminal 1502. Accordingly, the terminal 1502 may receive the first training response message indicating that training is possible from the base station 1501.

In a step S1504, the terminal 1502 may perform training when the first training response message received from the base station 1501 indicates that training is possible. The terminal 1502 may perform training of the terminal-side AI model. Referring to the example of FIG. 14A, the terminal 1502 may perform training of the encoder 1421. In this case, the terminal 1502 may generate a training dataset for training the base station-side AI model. Here, the training dataset generated by the terminal 1502 may include the following information.

Training dataset
- Inputs of the terminal artificial neural network and latent variables (when the base station transmits a training request to the terminal)
- Latent variables and outputs of the base station artificial neural network (when the terminal transmits a training request to the base station)

In a step S1506, the terminal 1502 may transmit the training dataset to the base station 1501. Therefore, the base station 1501 may receive the dataset from the terminal 1502.

In s step S1508, the base station 1501 may perform training of the base station-side AI model using the training dataset received from the terminal 1502.

In a step S1510, the base station 1501 may transmit a second training response message to the terminal 1502. In this case, the second training response message may include training result information of the base station 1501. In other words, the second training response message may include information indicating a success or failure as a result of training the base station-side AI model. Accordingly, the terminal 1502 may receive the second training response message including information indicating success or failure as a result of training the base station-side AI model from the base station 1501 in the step S1510.

Figure 16:
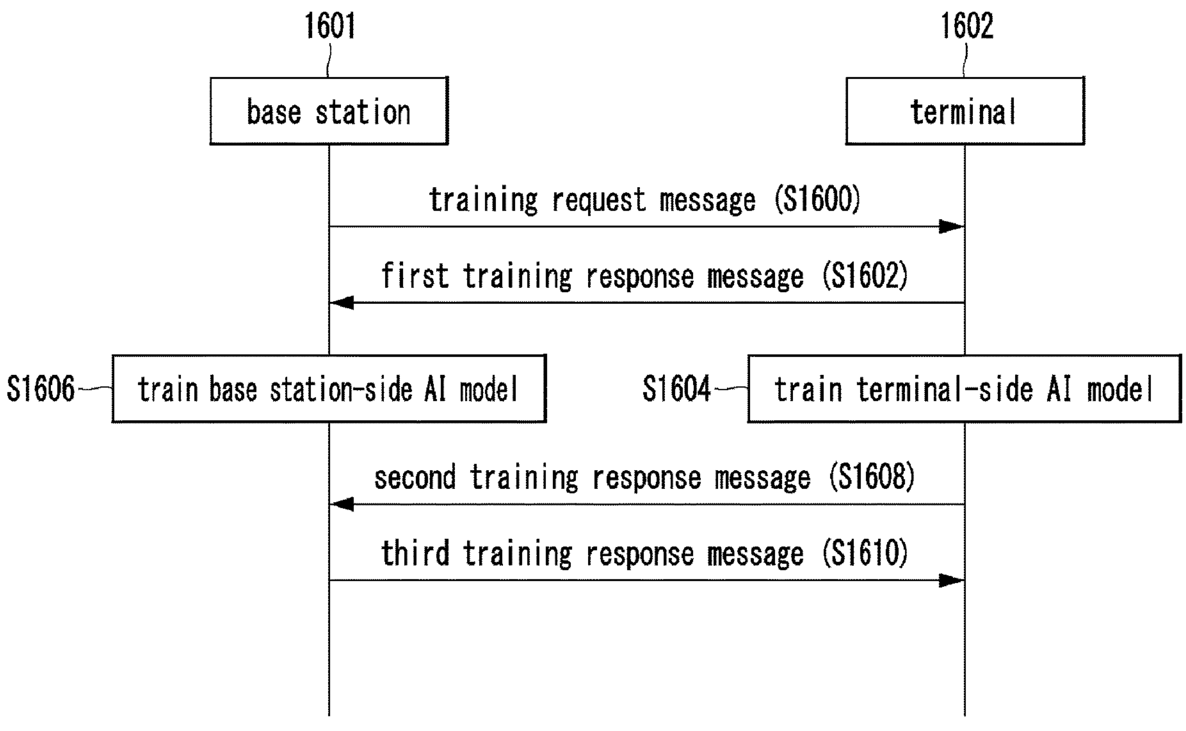
FIG. 16 is a sequence chart describing a parallel training procedure of AI model for transmitting and receiving CSI feedback information.

FIG. 16 is a sequence chart describing a parallel training procedure of AI model for transmitting and receiving CSI feedback information.

Referring to FIG. 16, a base station 1601 and a terminal 1602 are illustrated. Each of the base station 1601 and the terminal 1602 may include all or part of the components previously described in FIG. 2. As described in FIG. 15, the base station 1601 and the terminal 1602 may be understood as being replaced with a first communication node and a second communication node, respectively, in various types of wireless communication systems.

The exemplary embodiment of FIG. 16 illustrates a case in which training is triggered by the base station 1601 transmitting a training request message to the terminal 1602, unlike the exemplary embodiment of FIG. 15 described above.

In a step S1600, the base station 1601 may transmit a training request message to the terminal 1602. The training request message may have the same structure as the training request message described in FIG. 15. Therefore, the terminal 1602 may receive the training request message from the base station 1601 in the step S1600.

In a step S1602, the terminal 1602 may identify whether an AI model for which the base station has requested training can be trained in response to receiving the training request message. The terminal 1602 may transmit a first training response message including information on whether training is possible to the base station 1501. In FIG. 16, it is assumed that the terminal 1602 indicates that training is possible in the first training response message.

In a step S1604, the terminal 1602 may perform training of the terminal-side AI model. This will be described using the example of FIG. 14B. The terminal 1602 in FIG. 16 may correspond to the terminal 1420 in FIG. 14B. Therefore, the terminal 1602 in FIG. 16 may include both a decoder and an encoder, and a part in which the AI model needs be trained may be the encoder 1423. Therefore, the terminal 1602 may perform AI model training of the terminal for the encoder 1423 and decoder 1422 provided therein.

In a step S1606, the base station 1601 may perform training of the base station-side AI model. This will be described using the example of FIG. 14B. The base station 1601 in FIG. 16 may correspond to base station 1410 in FIG. 14B. Therefore, the base station 1601 in FIG. 16 may include both a decoder and an encoder, and a part in which the AI model needs be trained may be the decoder 1412. Therefore, the base station 1601 may perform AI model training of the base station for the encoder 1413 and decoder 1412 provided therein.

In the steps S1604 and S1606, the terminal 1602 and the base station 1601 may each perform training of their AI models in parallel.

When the training is completed, each of the terminal 1602 and the base station 1601 may transmit a second training response message (S1608) and a third training response message (S1610) to the other side. Here, both the second training response message and the third training response message may include information indicating a success or failure as a result of training the AI model.

When equivalence of input and output is supported, the base station 1601 or the terminal 1602 may assume that the input of the terminal artificial neural network or the output of the base station artificial neural network of the received dataset is equivalent to the output of the base station artificial neural network or the input of the terminal artificial neural network.

Meanwhile, according to another exemplary embodiment of the present disclosure, a decentralized and sequential training may be performed. When distributed and sequential training is performed, the latent variables of the dataset delivered for training may be quantized, and for this purpose, configuration information related to quantization of the latent variables may be additionally transmitted as being included in the training request information.

Configuration information related to quantization of latent variables may include the information below.

Artificial neural network and training dataset structure
- Whether latent variables are quantized
- Quantization scheme of latent variables (when quantization of the latent variables is performed)

When quantization is applied to the latent variables in the dataset, training may be performed by de-quantizing the received latent variables during the training process.

[4] Quantization Aware Training Method

According to an exemplary embodiment of the present disclosure, when training a two-sided AI model and/or ML model that operates based on non-quantized latent variables, the performance of operations including quantization can be improved. For example, in the training process of the restoration artificial neural network of the base station, quantization and de-quantization processes may be performed for non-quantized latent variables by assuming a specific quantization scheme. Then, a result of quantization and de-quantization assuming the specific quantization scheme may be used as input to the base station restoration artificial neural network. Here, the assumed quantization scheme may be one of the quantization schemes indicated to the terminal in actual operations.

FIG. 17 is a conceptual diagram illustrating a quantization aware training method for AI model for transmitting and receiving CSI feedback information.

According to an exemplary embodiment of the present disclosure, it is assumed that a two-sided AI model and/or ML model is centrally trained in a specific entity, either a base station or a terminal. In this case, the two-sided AI model and/or ML model may be trained without considering quantization, and then a specific quantization scheme may be applied thereto. The improvement of the performance may be necessary when quantization is applied to the two-sided AI model and/or ML model that does not consider quantization. Therefore, to improve performance when quantization is applied to the two-sided AI model and/or ML model trained without considering quantization, additional training of the base station's restoration artificial neural network may be performed using the input of latent variables quantized and de-quantized using the corresponding quantization scheme. In this case, as an example of the quantization scheme being performed, a 2-bit unform quantization scheme may be applied.

Referring to FIG. 17, a node that centrally trains the two-sided AI model and/or two-sided ML model may be the base station, terminal, or server. In addition, each of an encoder 1720 and decoder 1740 based on the two-sided AI models and/or two-sided ML models may be a model in which the quantization scheme is not applied. Therefore, the node training the two-sided AI model and/or two-sided ML model according to the present disclosure may generate a latent variable 1721 by encoding a subband 1710 for CSI reporting by the encoder 1720. In this case, the encoder may be a fixed encoder. The latent variable 1721 output from the encoder 1720 may be subjected to a quantization/de-quantization procedure 1730. The latent variable 1731 subjected to the quantization/de-quantization procedure 1730 may be the same as the latent variable 1721 before performing the quantization/de-quantization procedure 1730, or may have a different value therefrom. This may be understood as a form in which noise due to a certain portion of quantization/de-quantization is inserted through the quantization/de-quantization procedure 1730. Therefore, the latent variable 1731 including noise may be input to the decoder 1740. Then, the decoder 1740 may obtain final CSI for all subbands through decoding. In this case, since the decoder 1740 is trained using the latent variable 1731 including noise, it can be trained in a form that can cancel out noise due to the quantization and de-quantization procedures.

The above operation may be performed repeatedly as indicated by reference numeral 1700, and the number of repetitions may be set in advance.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of a terminal, comprising:

receiving a channel state information (CSI) request message from a base station, the CSI request message including first indication information indicating one of quantization configuration information of a first artificial intelligence (AI) model configured in the terminal to encode and transmit CSI;

quantizing generated CSI feedback information based on the first indication information; and transmitting a CSI report message including the quantized CSI feedback information to the base station-, wherein the quantization configuration information of the first AI model includes information on a codebook consisting of latent variables when performing vector quantization and a number of quantized bits for each dimension of the latent variable when performing scalar quantization.

2. The method according to claim 1, wherein the CSI request message further includes second indication information for subband(s) and layer(s), and the second indication information indicates one of:

(1) individual subband and individual layer;

(2) all subbands and individual layer;

(3) individual subband and all layers; and (4) all subbands and all layers.

3. The method according to claim 2, wherein when the CSI request message further includes third indication information requesting at least one of common information of all subbands or common information of all layers, the CSI feedback information further includes common information of all subbands and common information of all layers, and the CSI feedback information report message includes at least one of the common information of all subbands or the common information of all layers.

4. The method according to claim 1, further comprising:

performing training of the first AI model and a second AI model configured in a base station to decode the CSI feedback information;

transmitting the second AI model to the base station; and transmitting quantization configuration information of the first AI model to the base station, wherein the quantization configuration information of the first AI model is generated based on a distribution of latent variables for input datasets of the first AI model and the second AI model.

5. The method according to claim 1, wherein the information elements included in the quantization configuration information of the first AI model further includes reference numbers respectively mapped to quantization schemes, wherein the quantization schemes of the first AI model include a vector quantization scheme, and a scalar quantization scheme.

6. The method according to claim 1, wherein the information elements included in the quantization configuration information of the first AI model further includes information on a minimum value and a maximum value required when using the scalar quantization scheme.

7. The method of claim 1, wherein the quantization configuration information further includes information on a dimensionality of the latent variable.

8. The method of claim 1, further comprising:

receiving a plurality of codebooks from the base station in advance, and wherein the codebook is one codebook selected from the plurality of codebooks based on the first indication information.

9. A method of a base station, comprising:

transmitting, to a terminal, a channel state information (CSI) request message including first indication information indicating one of quantization configuration information of a first artificial intelligence (AI) model configured in the terminal to encode and transmit CSI; and receiving, from the terminal, a CSI report message including CSI feedback information quantized based on the first indication information of the CSI request message, wherein the quantization configuration information of the first AI model includes information on a codebook consisting of latent variables when performing vector quantization and a number of quantized bits for each dimension of the latent variable when performing scalar quantization.

10. The method according to claim 9, wherein the CSI request message further includes second indication information for subband(s) and layer(s), and the second indication information indicates one of:

(1) individual subband and individual layer;

(2) all subbands and individual layer;

(3) individual subband and all layers; and (4) all subbands and all layers.

11. The method according to claim 10, wherein the CSI request message further includes third indication information requesting at least one of common information of all subbands or common information of all layers, and the CSI feedback information report message includes at least one of the common information of all subbands or the common information of all layers.

12. The method according to claim 9, further comprising:

receiving a second AI model from the terminal; and receiving quantization configuration information of the first AI model from the terminal.

13. The method according to claim 9, wherein the information elements included in the quantization configuration information of the first AI model further includes reference numbers respectively mapped to quantization schemes, wherein the quantization schemes of the first AI model include a vector quantization scheme, a uniform scalar quantization scheme, and a non-uniform scalar quantization scheme.

14. The method according to claim 9, wherein the information elements included in the quantization configuration information of the first AI model further include information on a minimum value and a maximum value required when using the scalar quantization scheme.

15. The method according to claim 9, further comprising:

receiving a training request message from the terminal, the training request message including training type-related information of the first AI model and the second AI model;

identifying whether training of the second AI model is possible;

in response to identifying that the training of the second AI model is possible, transmitting a first training response message indicating that the training is possible to the terminal;

receiving a dataset for training the second AI model from the terminal;

training the second AI model using the dataset; and transmitting a second training response message including information on a training result of the second AI model to the terminal.

16. The method according to claim 15, wherein the training type-related information includes an input type, input dimension, input representation scheme, latent dimension, and latent representation scheme of the first AI model and the second AI model.

17. The method of claim 9, wherein the quantization configuration information further includes information on a dimensionality of the latent variable.

18. The method of claim 9, further comprising:

transmitting a plurality of codebooks to the terminal in advance, and wherein the first indication information indicates the codebook among the plurality of codebooks.

19. A terminal comprising at least one processor, wherein the at least one processor causes the terminal to perform:

receiving a channel state information (CSI) request message from a base station, the CSI request message including first indication information indicating one of quantization configuration information of a first artificial intelligence (AI) model configured in the terminal to encode and transmit CSI;

quantizing generated CSI feedback information based on the first indication information; and transmitting a CSI report message including the quantized CSI feedback information to the base station-, wherein the quantization configuration information of the first AI model includes information on a codebook consisting of latent variables when performing vector quantization and a number of quantized bits for each dimension of the latent variable when performing scalar quantization.

20. The terminal according to claim 19, wherein the at least one processor further causes the terminal to perform:

performing training of the first AI model and a second AI model configured in a base station to decode the CSI feedback information;

transmitting the second AI model to the base station; and transmitting the quantization configuration information of the first AI model to the base station, wherein the quantization configuration information of the first AI model is generated based on a distribution of latent variables for input datasets of the first AI model and the second AI model.

* * * * *